US009113492B2

(12) United States Patent
Maguluri et al.

(10) Patent No.: US 9,113,492 B2
(45) Date of Patent: Aug. 18, 2015

(54) METHOD AND APPARATUS FOR TRANSMIT PRIORITY DETERMINATION WITHIN A LINK

(75) Inventors: Siva Theja Maguluri, Bridgewater, NJ (US); Xinzhou Wu, Monmouth Junction, NJ (US); Sundar Subramanian, Somerville, NJ (US)

(73) Assignee: QUALCOMM Incorporated, San Diego, CA (US)

( * ) Notice: Subject to any disclaimer, the term of this patent is extended or adjusted under 35 U.S.C. 154(b) by 446 days.

(21) Appl. No.: 13/290,312

(22) Filed: Nov. 7, 2011

(65) Prior Publication Data
US 2013/0114424 A1 May 9, 2013

(51) Int. Cl.
*H04W 72/12* (2009.01)
*H04W 84/18* (2009.01)
*H04W 28/02* (2009.01)

(52) U.S. Cl.
CPC ........ *H04W 72/1247* (2013.01); *H04W 28/021* (2013.01); *H04W 72/1231* (2013.01); *H04W 84/18* (2013.01)

(58) Field of Classification Search
CPC ... H04W 84/18; H04W 76/023; H04W 72/10; H04W 74/04; H04W 52/241; H04W 52/383; H04W 74/0816; H04W 72/0446; H04W 72/1247; H04W 74/0825; H04L 1/0026
USPC ............. 370/329, 252, 395.42; 455/501, 513, 455/135, 67.11
See application file for complete search history.

(56) References Cited

U.S. PATENT DOCUMENTS

| | | | |
|---|---|---|---|
| 6,934,297 B1 * | 8/2005 | Bensaou et al. | 370/445 |
| 7,079,508 B2 | 7/2006 | Ayyagari et al. | |
| 7,570,593 B1 * | 8/2009 | ElBatt et al. | 370/238 |
| 7,864,674 B2 | 1/2011 | Benveniste | |
| 2004/0258039 A1 | 12/2004 | Stephens | |
| 2006/0007863 A1 * | 1/2006 | Naghian | 370/238 |
| 2007/0041398 A1 * | 2/2007 | Benveniste | 370/448 |

(Continued)

FOREIGN PATENT DOCUMENTS

WO WO02096036 A1 11/2002

OTHER PUBLICATIONS

Rebai, Ahmed Riadh et al., "A Dynamic Multimedia User-Weight Classification Scheme for IEEE_802.11 WLANs", International Journal of Computer Networks & Communications (IJCNC), vol. 3, No. 2, Mar. 2011, pp. 217-231.

(Continued)

*Primary Examiner* — Yee Lam
(74) *Attorney, Agent, or Firm* — James K. O'Hare

(57) ABSTRACT

A method, computer program product, and an apparatus for a transmit priority distributed backoff are provided. The apparatus forms a peer-to-peer communication link with a second apparatus. In addition, the apparatus determines whether to transmit in an assigned resource for securing a transmit priority for transfer of data to the second apparatus based on a quality of service estimation. Furthermore, the apparatus transmits to the second apparatus based on the determination. A method, computer program product, and an apparatus for a transmit priority token passing are provided. The apparatus forms a peer-to-peer communication link with a second apparatus. In addition, the apparatus determines a transmit priority within the link based on a quality of service estimation. The transmit priority is a priority of transmission between the apparatus and the second apparatus in the link.

41 Claims, 20 Drawing Sheets

(56) References Cited

U.S. PATENT DOCUMENTS

| | | | |
|---|---|---|---|
| 2009/0196306 A1* | 8/2009 | King et al. | 370/462 |
| 2010/0034191 A1* | 2/2010 | Schulz | 370/350 |
| 2010/0255850 A1* | 10/2010 | Kaukoranta et al. | 455/450 |
| 2010/0284380 A1 | 11/2010 | Banerjee et al. | |
| 2011/0213824 A1* | 9/2011 | Juric | 709/203 |
| 2011/0225311 A1* | 9/2011 | Liu et al. | 709/231 |
| 2011/0244789 A1* | 10/2011 | Wen et al. | 455/9 |
| 2012/0250632 A1* | 10/2012 | Mo et al. | 370/329 |
| 2013/0089046 A1* | 4/2013 | Lim et al. | 370/329 |

OTHER PUBLICATIONS

International Search Report and Written Opinion—PCT/US2012/063934—ISA/EPO—Feb. 13, 2013.

Wu, X., et al., "FlashLinQ: A synchronous distributed scheduler for peerto-peer ad hoc networks", Communication, Control, and Computing(Allerton), 2010 48th Annual Allerton Conference on, IEEE, Sep. 29, 2010, pp. 514-521, XP031899421, DOI: 10.1109/Allerton.2010.5706950, ISBN: 978-1-4244-8215-3.

* cited by examiner

METHOD AND APPARATUS FOR TRANSMIT PRIORITY DETERMINATION WITHIN A LINK

BACKGROUND

1. Field

The present disclosure relates generally to communication systems, and more particularly, to transmit priority determination within a link.

2. Background

In a time slotted ad-hoc network with a designated phase for medium access contention, links may contend simultaneously for the medium based on a link priority. Within a link, a transmit priority between devices in the link may be distributed between the devices. For example, a first device in a link may have transmit priority over a second device in the link in every other slot. Such a distribution of transmit priority may not result in the best use of resources from a quality of service (QoS) standpoint if one of the devices is not meeting its QoS requirements based on the distribution of the transmit priority. As such, there is a need for a method and an apparatus for determining transmit priority within a link so as to improve a QoS.

SUMMARY

In an aspect of the disclosure, a method, a computer program product, and an apparatus for a transmit priority distributive backoff is provided. The apparatus forms a peer-to-peer communication link with a second apparatus. The apparatus determines whether to transmit in an assigned resource for securing a transmit priority for transfer of data to the second apparatus based on a quality of service estimation. The apparatus transmits to the second apparatus based on the determination.

In an aspect of the disclosure, a method, a computer program product, and an apparatus for a transmit priority token passing is provided. The apparatus forms a peer-to-peer communication link with a second apparatus. The apparatus determines a transmit priority within the link based on a quality of service estimation. The transmit priority is a priority of transmission between the apparatus and the second apparatus in the link.

DETAILED DESCRIPTION

Figure 1:
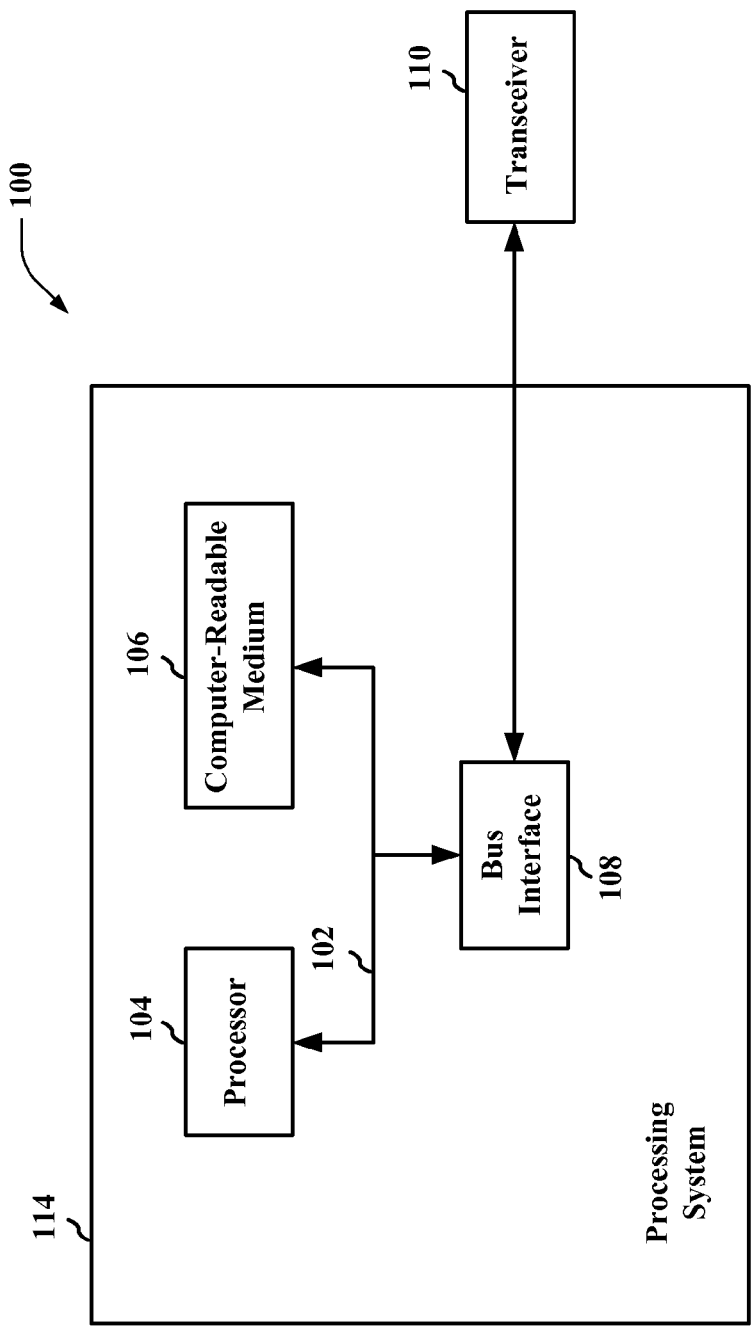
FIG. 1 is a diagram illustrating an example of a hardware implementation for an apparatus employing a processing system.

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well known structures and components are shown in block diagram form in order to avoid obscuring such concepts.

Several aspects of communication systems will now be presented with reference to various apparatus and methods. These apparatus and methods will be described in the following detailed description and illustrated in the accompanying drawing by various blocks, modules, components, circuits, steps, processes, algorithms, etc. (collectively referred to as "elements"). These elements may be implemented using electronic hardware, computer software, or any combination thereof. Whether such elements are implemented as hardware or software depends upon the particular application and design constraints imposed on the overall system.

By way of example, an element, or any portion of an element, or any combination of elements may be implemented with a "processing system" that includes one or more processors. Examples of processors include microprocessors, microcontrollers, digital signal processors (DSPs), field programmable gate arrays (FPGAs), programmable logic devices (PLDs), state machines, gated logic, discrete hardware circuits, and other suitable hardware configured to perform the various functionality described throughout this disclosure. One or more processors in the processing system may execute software. Software shall be construed broadly to mean instructions, instruction sets, code, code segments, program code, programs, subprograms, software modules, applications, software applications, software packages, routines, subroutines, objects, executables, threads of execution, procedures, functions, etc., whether referred to as software, firmware, middleware, microcode, hardware description language, or otherwise. The software may reside on a computer-readable medium. The computer-readable medium may be a non-transitory computer-readable medium. A non-transitory computer-readable medium include, by way of example, a magnetic storage device (e.g., hard disk, floppy disk, magnetic strip), an optical disk (e.g., compact disk (CD), digital versatile disk (DVD)), a smart card, a flash memory device (e.g., card, stick, key drive), random access memory (RAM), read only memory (ROM), programmable ROM (PROM), erasable PROM (EPROM), electrically erasable PROM (EEPROM), a register, a removable disk, and any other suitable medium for storing software and/or instructions that may be accessed and read by a computer. The computer-readable medium may be resident in the processing system, external to the processing system, or distributed across multiple entities including the processing system. The computer-readable medium may be embodied in a computer-program product. By way of example, a computer-program product may include a computer-readable medium in packaging materials.

Accordingly, in one or more exemplary embodiments, the functions described may be implemented in hardware, software, firmware, or any combination thereof. If implemented in software, the functions may be stored on or encoded as one or more instructions or code on a computer-readable medium. Computer-readable media includes computer storage media. Storage media may be any available media that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Disk and disc, as used herein, includes compact disc (CD), laser disc, optical disc, digital versatile disc (DVD), floppy disk and Blu-ray disc where disks usually reproduce data magnetically, while discs reproduce data optically with lasers. Combinations of the above should also be included within the scope of computer-readable media. Those skilled in the art will recognize how best to implement the described functionality presented throughout this disclosure depending on the particular application and the overall design constraints imposed on the overall system.

FIG. 1 is a conceptual diagram illustrating an example of a hardware implementation for an apparatus 100 employing a processing system 114. The processing system 114 may be implemented with a bus architecture, represented generally by the bus 102. The bus 102 may include any number of interconnecting buses and bridges depending on the specific application of the processing system 114 and the overall design constraints. The bus 102 links together various circuits including one or more processors and/or hardware modules, represented generally by the processor 104, and computer-readable media, represented generally by the computer-readable medium 106. The bus 102 may also link various other circuits such as timing sources, peripherals, voltage regulators, and power management circuits, which are well known in the art, and therefore, will not be described any further. A bus interface 108 provides an interface between the bus 102 and a transceiver 110. The transceiver 110 provides a means for communicating with various other apparatuses over a transmission medium.

The processor 104 is responsible for managing the bus 102 and general processing, including the execution of software stored on the computer-readable medium 106. The software, when executed by the processor 104, causes the processing system 114 to perform the various functions described infra for any particular apparatus. The computer-readable medium 106 may also be used for storing data that is manipulated by the processor 104 when executing software.

Figure 2:
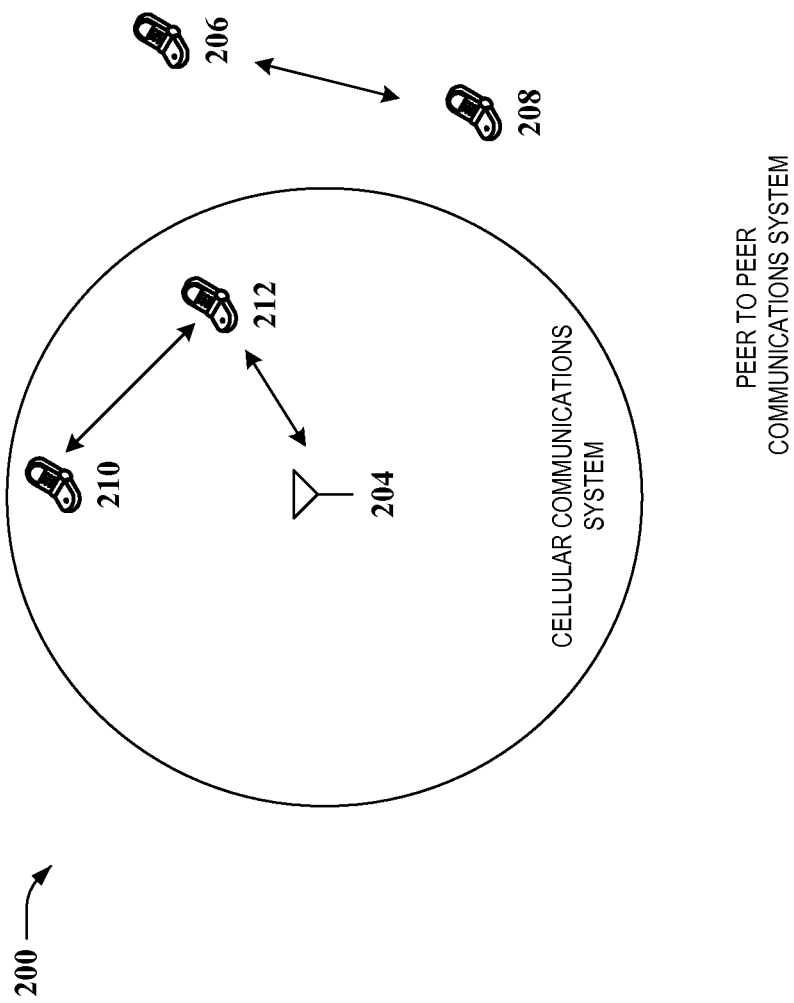
FIG. 2 is a drawing of a wireless peer-to-peer communications system.

FIG. 2 is a drawing of an exemplary peer-to-peer communications system 200. The peer-to-peer communications system 200 includes a plurality of wireless devices 206, 208, 210, 212. The peer-to-peer communications system 200 may overlap with a cellular communications system, such as for example, a wireless wide area network (WWAN). Some of the wireless devices 206, 208, 210, 212 may communicate together in peer-to-peer communication, some may communicate with the base station 204, and some may do both. For example, as shown in FIG. 2, the wireless devices 206, 208 are in peer-to-peer communication and the wireless devices 210, 212 are in peer-to-peer communication. The wireless device 212 is also communicating with the base station 204.

The wireless device may alternatively be referred to by those skilled in the art as user equipment, a mobile station, a subscriber station, a mobile unit, a subscriber unit, a wireless unit, a wireless node, a remote unit, a mobile device, a wireless communication device, a remote device, a mobile subscriber station, an access terminal, a mobile terminal, a wireless terminal, a remote terminal, a handset, a user agent, a mobile client, a client, or some other suitable terminology. The base station may alternatively be referred to by those skilled in the art as an access point, a base transceiver station, a radio base station, a radio transceiver, a transceiver function, a basic service set (BSS), an extended service set (ESS), a Node B, an evolved Node B, or some other suitable terminology.

The exemplary methods and apparatuses discussed infra are applicable to any of a variety of wireless peer-to-peer communications systems, such as for example, a wireless peer-to-peer communication system based on FlashLinQ, WiMedia, Bluetooth, ZigBee, or Wi-Fi based on the IEEE 802.11 standard. To simplify the discussion, the exemplary methods and apparatus are discussed within the context of FlashLinQ. However, one of ordinary skill in the art would understand that the exemplary methods and apparatuses are applicable more generally to a variety of other wireless peer-to-peer communication systems.

Figure 3:
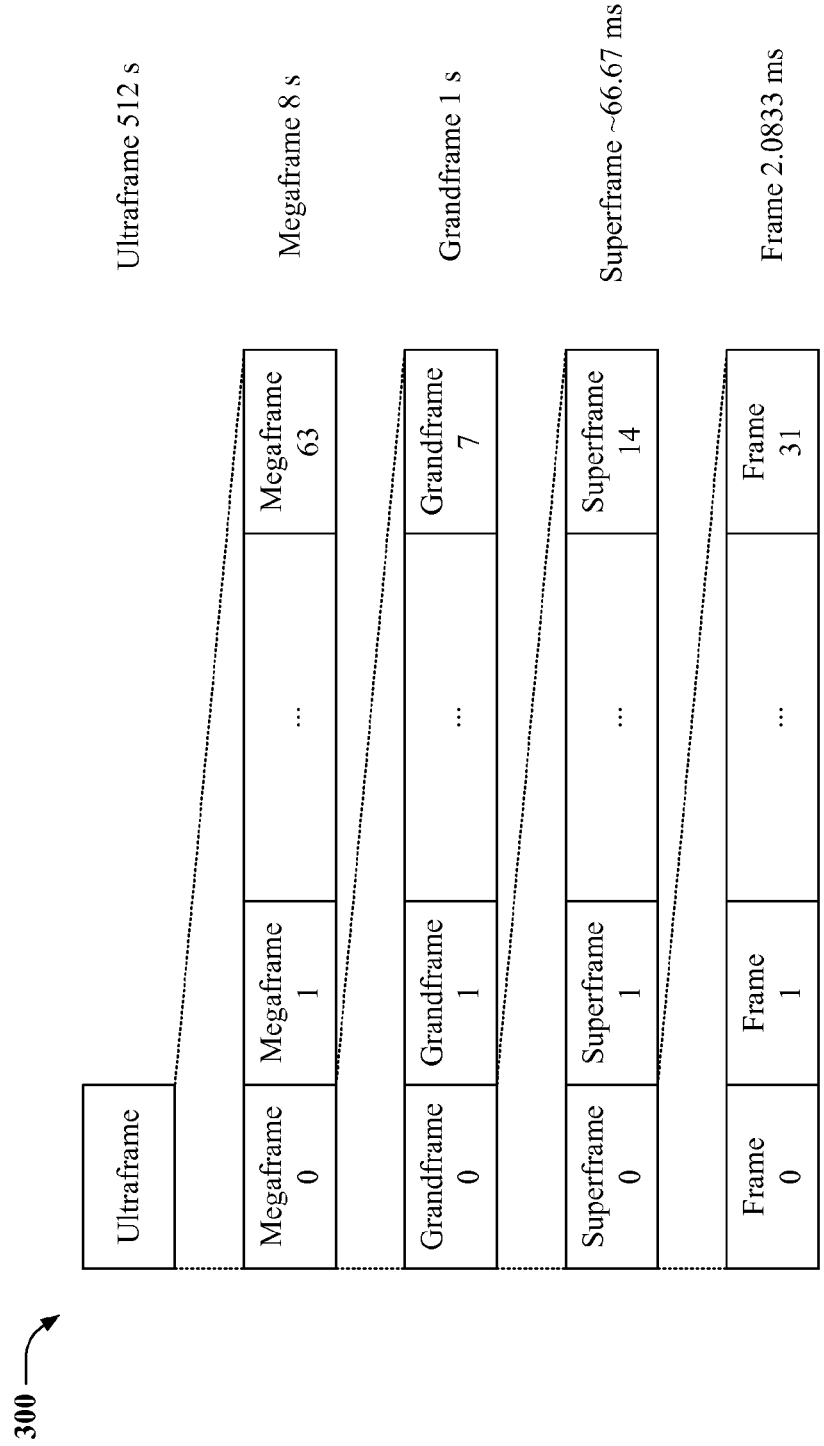
FIG. 3 is a diagram illustrating an exemplary time structure for peer-to-peer communication between the wireless devices.

FIG. 3 is a diagram 300 illustrating an exemplary time structure for peer-to-peer communication between the wireless devices 100. An ultraframe is 512 seconds and includes 64 megaframes. Each megaframe is 8 seconds and includes 8 grandframes. Each grandframe is 1 second and includes 15 superframes. Each superframe is approximately 66.67 ms and includes 32 frames. Each frame is 2.0833 ms.

Figure 4:
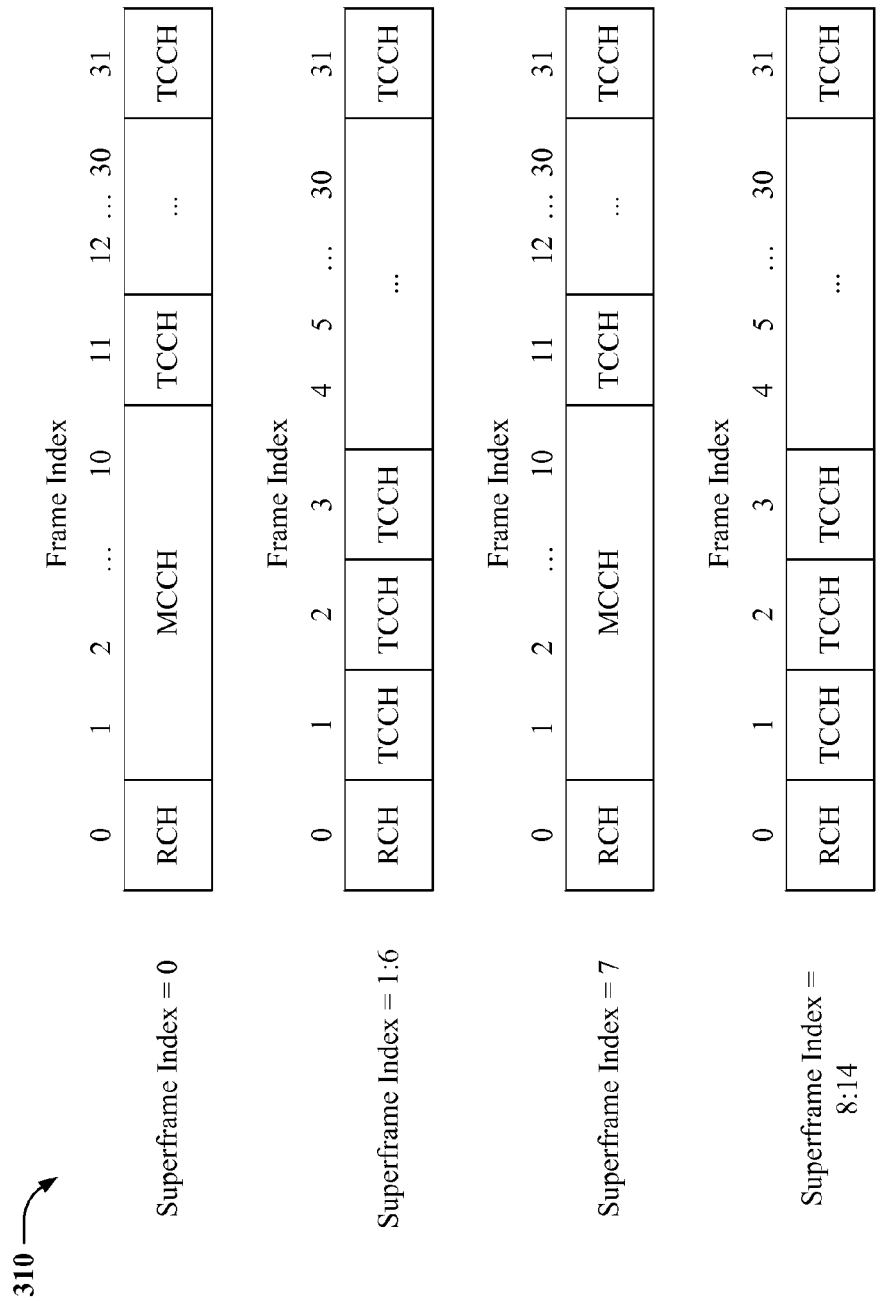
FIG. 4 is a diagram illustrating the channels in each frame of superframes in one grandframe.

FIG. 4 is a diagram 310 illustrating the channels in each frame of superframes in one grandframe. In a first superframe (with index 0), frame 0 is a reserved channel (RCH), frames 1-10 are each a miscellaneous channel (MCCH), and frames 11-31 are each a traffic channel (TCCH). In the $2^{nd}$ through $7^{th}$ superframes (with index 1:6), frame 0 is a RCH and frames 1-31 are each a TCCH. In an $8^{th}$ superframe (with index 7), frame 0 is a RCH, frames 1-10 are each a MCCH, and frames 11-31 are each a TCCH. In the $9^{th}$ through $15^{th}$ superframes (with index 8:14), frame 0 is a RCH and frames 1-31 are each a TCCH. The MCCH of superframe index 0 includes a secondary timing synchronization channel, a peer discovery channel, a peer page channel, and a reserved slot. The MCCH of superframe index 7 includes a peer page channel and reserved slots. The TCCH includes connection scheduling, a pilot, channel quality indicator (CQI) feedback, a data segment, and an acknowledgement (ACK).

Figure 5:
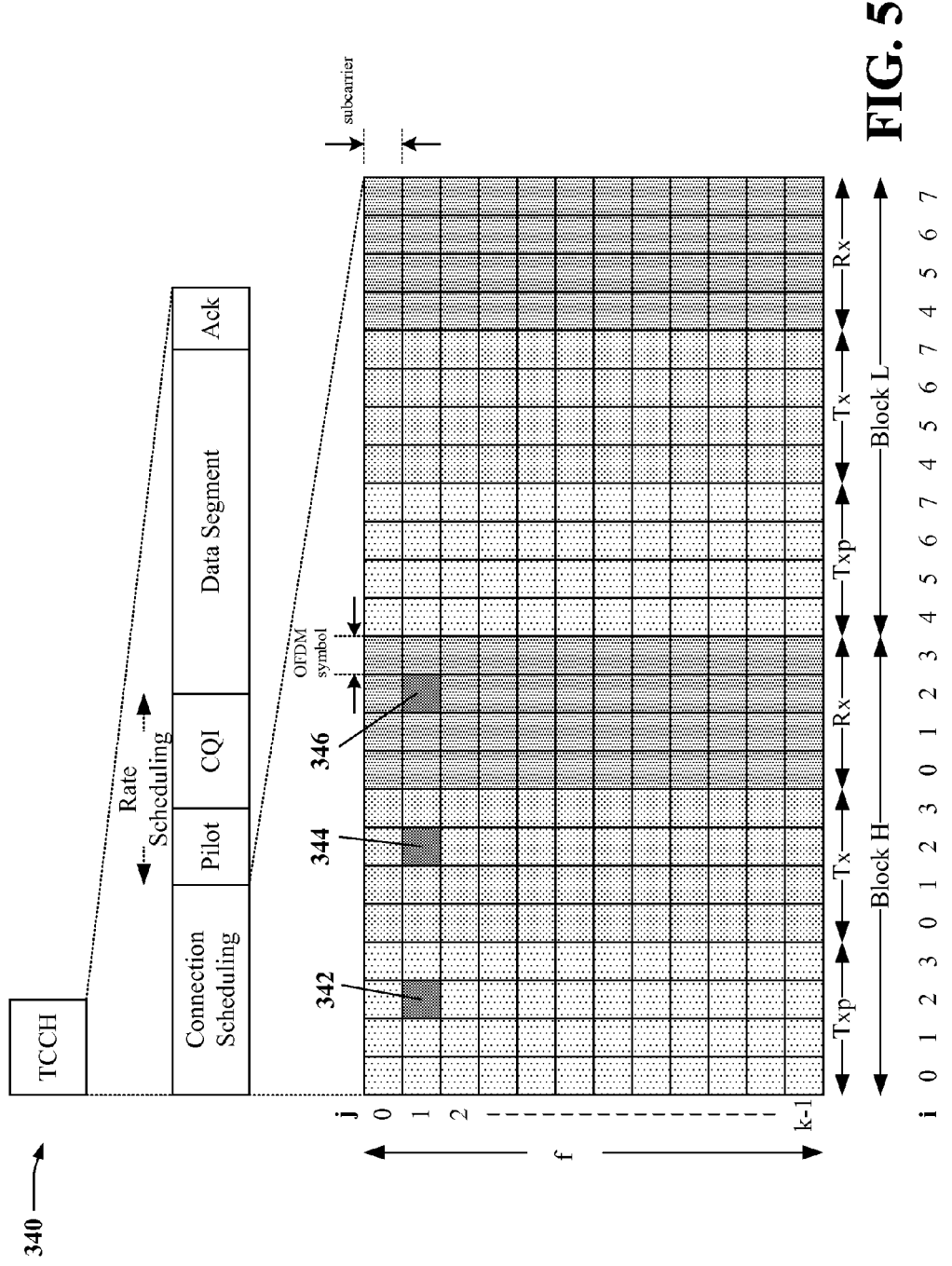
FIG. 5 is a diagram illustrating an operation timeline of a traffic channel slot and a structure of connection scheduling.

FIG. 5 is a diagram 340 illustrating an operation timeline of a TCCH slot and a structure of connection scheduling. As shown in FIG. 5, a TCCH slot includes four subchannels: connection scheduling, rate scheduling, data segment, and ACK. The rate scheduling subchannel includes a pilot segment and a CQI segment. The ACK subchannel is for transmitting an ACK or negative ACK (NACK) in response to data received in the data segment subchannel. The connection scheduling subchannel includes two blocks, a higher priority Block H and a lower priority Block L. Each of Block H and Block L contains a plurality of resource elements, i.e., a plurality of subcarriers in the frequency domain and OFDM symbols in the time domain. Each of Block H and Block L spans the plurality of subcarriers and includes four OFDM symbols in a Txp-block, four OFDM symbols in a Tx-block, and four OFDM symbols in an Rx-block. One resource element (or tone) corresponds to one subcarrier and one OFDM symbol.

Each link has a CID. Based on the CID, for a particular TCCH slot, wireless devices in a link are allocated a resource element in the same respective OFDM symbol position in each of the Txp-block, the Tx-block, and the Rx-block at a particular subcarrier and within Block H or Block L. For example, in a particular TCCH slot, a link with CID=4 may be allocated the resource element 342 in the Txp-block of Block H, the resource element 344 in the Tx-block of Block H, and the resource element 346 in the Rx-block of Block H for transmitting/receiving a scheduling control signal. A transmit request signal in the Tx-block is transmitted with a power equal to a power for transmitting the data segment. A transmit request response signal in the Rx-block is transmitted with a power proportional to an inverse of the power of the received transmit request signal. The allocated trio of resource elements for the Txp-block, Tx-block, and Rx-block vary with respect to the subcarrier (e.g., k different subcarriers) and the respective OFDM symbol in each TCCH slot (e.g., 8 different OFDM symbols—4 in the Block H and 4 in the Block L).

The trio of resource elements allocated to a link dictates the medium access priority of the link. For example, the trio of resource elements 342, 344, 346 corresponds to i=2 and j=1. The medium access priority is equal to ki+j+1, where i is the respective OFDM symbol in each of the Txp, Tx, and Rx subblocks, j is the subcarrier, and k is the number of subcarriers. Accordingly, assuming k=28, the resource elements 342, 344, 346 correspond to a medium access priority of 58.

Figure 6:
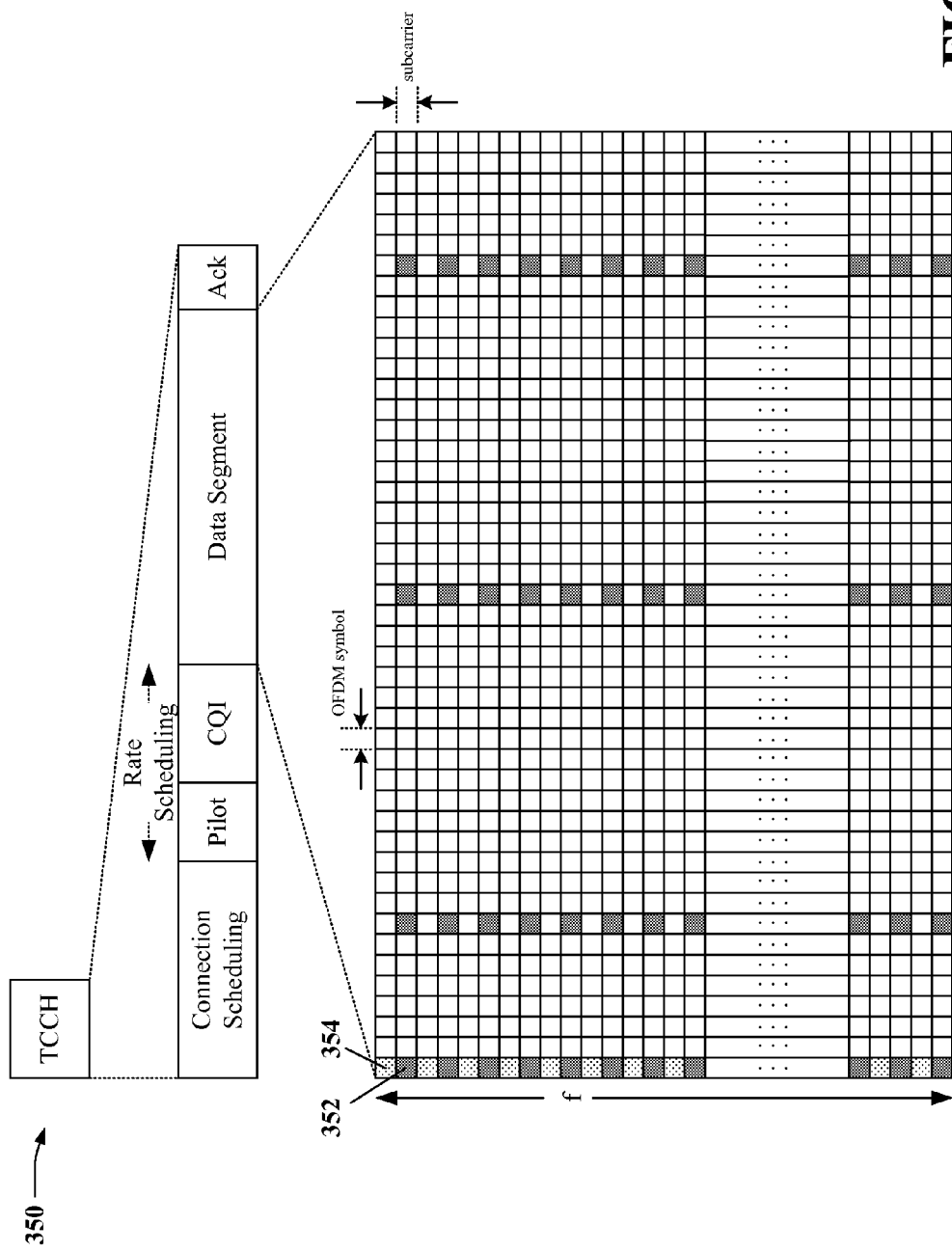
FIG. 6 is a diagram illustrating a structure of a data segment.

FIG. 6 is a diagram 350 illustrating a structure of the data segment. The data segment contains a plurality of resource elements spanning a plurality of subcarriers in the frequency domain and OFDM symbols in the time domain. Some of the resource elements in the data segment, such as resource element 354, may carry rate indicator information regarding the coding and/or modulation used for the data segment. Other resource elements in the data segment, such as resource element 352, may carry a pilot to allow for estimating the channel for demodulation and decoding.

Figure 7:
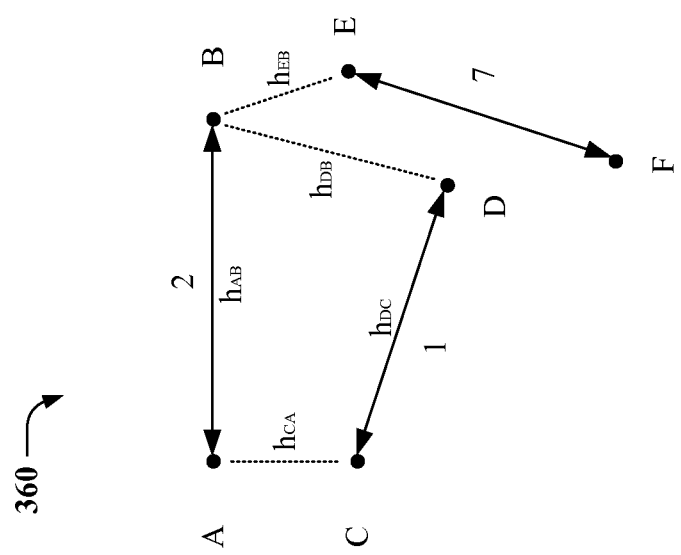
FIG. 7 is a first diagram for illustrating a connection scheduling signaling scheme for the wireless devices.

FIG. 7 is a first diagram 360 for illustrating an exemplary connection scheduling signaling scheme for the wireless devices 100. As shown in FIG. 7, wireless device A is communicating with wireless device B, wireless device C is communicating with wireless device D, and wireless device E is communicating with wireless device F. The wireless device A is assumed to have transmit priority over the wireless device B, the wireless device C is assumed to have transmit priority over the wireless device D, and the wireless device E is assumed to have transmit priority over the wireless device F. Each of the links has a different medium access priority depending on the particular slot for communication. For the particular slot for communication, link 1 (A, B) is assumed to have a medium access priority of 2, link 2 (C, D) is assumed to have a medium access priority of 1, and link 3 (E, F) is assumed to have a medium access priority of 7.

Figure 8:
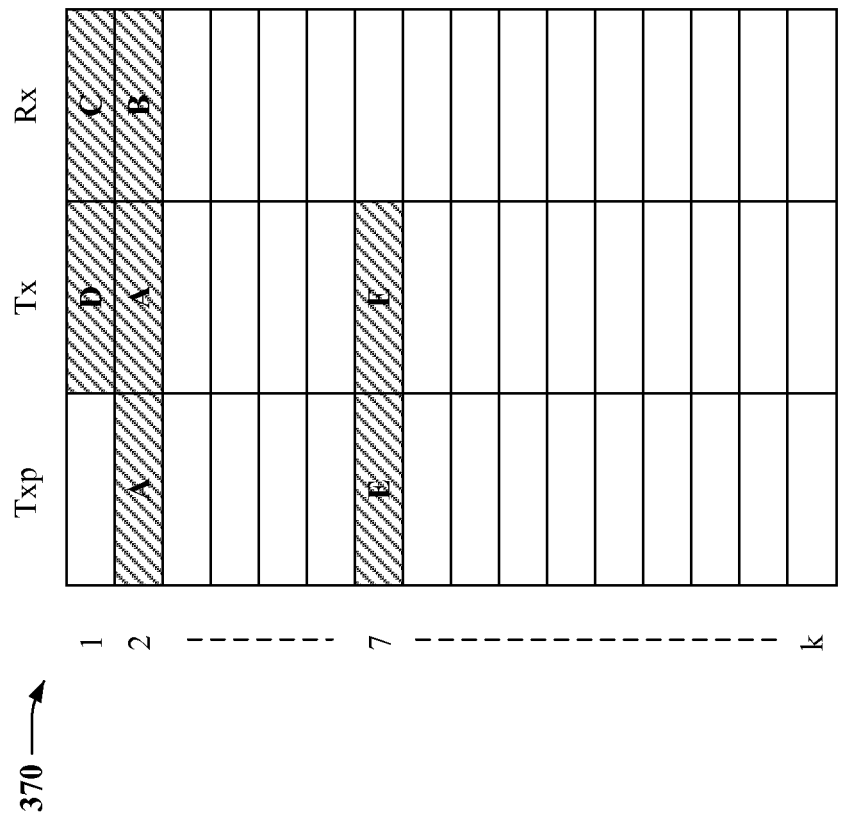
FIG. 8 is a second diagram for illustrating a connection scheduling signaling scheme for the wireless devices.

FIG. 8 is a second diagram 370 for illustrating an exemplary connection scheduling signaling scheme for the wireless devices 100. FIG. 8 shows connection scheduling resources of first respective OFDM symbols (i=0, see FIG. 5) of Txp, Tx, and Rx subblocks in Block H (corresponding to medium access priorities 1 through k) in the connection scheduling subchannel. The connection scheduling resources include a plurality of subcarriers, each of the subcarriers corresponding to one of k frequency bands. Each of the frequency bands corresponds to a particular medium access priority. One block in the connection scheduling resources is split into three subblocks/phases: Txp, Tx, and Rx. The Txp-block is used by the node with transmit priority in the link to indicate whether the node with transmit priority will act as a transmitter or a receiver. If the node with transmit priority transmits on the allocated OFDM symbol in the Txp-block, the node with transmit priority indicates to the node without transmit priority an intent to act as a transmitter. If the node with transmit priority does not transmit on the allocated OFDM symbol in the Txp-block, the node with transmit priority indicates to the node without transmit priority an intent to act as a receiver. The Tx-block is used by potential transmitters to make a request to be scheduled. The transmitter transmits a direct power signal on the allocated OFDM symbol in the Tx-block at a power equal to a power used for the traffic channel (i.e., a power for transmitting the data segment). Each potential receiver listens to the tones in the Tx-blocks, compares the received power on each of the Tx-blocks to the received power on the Tx-block allocated to the transmitter of its own link, and determines whether to Rx-yield based on its own link medium access priority relative to other link medium access priorities and the comparison.

For example, assume the nodes A, D, and E transmit a transmit request signal in the Tx-block at a power equal to $P_A$, $P_D$, and $P_E$, respectively. The node B receives the transmit request signal from the node A at a power equal to $P_A|h_{AB}|^2$, where $h_{AB}$ is the path loss between the node A and the node B. The node B receives the transmit request signal from the node D with a power equal to $P_D|h_{DD}|^2$, where $h_{DB}$ is the path loss between the node D and the node B. The node B receives the transmit request signal from the node E with a power equal to $P_E|h_{ED}|^2$, where $h_{EB}$ is the path loss between the node E and the node B. The node B compares the power of the received transmit request signal from the node A divided by the sum of the powers of the received transmit request signals from other nodes with a higher priority to a threshold in order to determine whether to Rx-yield. The node B does not Rx-yield if the node B expects a reasonable SIR if scheduled. That is, the node B Rx-yields unless $P_A|h_{AB}|^2/P_D|h_{DB}|^2 > \gamma_{RX}$, where $\gamma_{RX}$ is the threshold (e.g., 9 dB).

The Rx-block is used by the potential receivers. If the receiver chooses to Rx-yield, the receiver does not transmit in the allocated OFDM symbol in the Rx-block; otherwise, the receiver transmits an inverse echo power signal in the allocated OFDM symbol in the Rx-block at a power proportional to an inverse of the power of the received direct power signal from the transmitter of its own link. All of the transmitters listen to the tones in the Rx-block to determine whether to Tx-yield transmission of the data segment.

For example, the node C, having received the transmit request signal from the node D at a power equal to $P_D|h_{DC}|^2$, transmits a transmit request response signal in the Rx-block at a power equal to $K/P_D|h_{DC}|^2$, where $h_{DC}$ is the path loss between the node D and the node C, and K is a constant known to all nodes. The node A receives the transmit request response signal from the node C at a power equal to $K|h_{CA}|^2/P_D|h_{DC}|^2$, where $h_{CA}$ is the path loss between the node C and the node A. The node A Tx-yields if the node A would cause too much interference to the node C. That is, the node A Tx-yields unless $P_D|h_{DC}|/P_A|h_{CA}|^2 > \gamma_{TX}$, where $\gamma_{TX}$ is a threshold (e.g., 9 dB).

The connection scheduling signaling scheme is best described in conjunction with an example. The node C has no data to transmit and does not transmit in the Txp-block for medium access priority 1, the node A has data to transmit and transmits in the Txp-block for medium access priority 2, and the node E has data to transmit and transmits in the Txp-block for medium access priority 7. The node D has data to transmit and transmits in the Tx-block for medium access priority 1, the node A transmits in the Tx-block for medium access priority 2, and the node E transmits in the Tx-block for medium access priority 7. The node C listens to the tones in the Tx-blocks and determines to transmit in the Rx-block for medium access priority 1, as the node C has the highest priority. The node B listens to the tones in the Tx-blocks, determines that its link would not interfere with link 2, which has a higher medium access priority, and transmits in the Rx-block for medium access priority 2. The node F listens to the tones in the Tx-blocks, determines that its link would interfere with link 1 and/or link 2, both of which have a higher medium access priority, and Rx-yields by not transmitting in the Rx-block for medium access priority 7. Subsequently, both D and A listen to the tones in the Rx blocks to determine whether to transmit the data. Because D has a higher link medium access priority than A, D transmits its data. A will Tx-yield transmission of the data if A determines that its transmission would interfere with the transmission from D.

As discussed supra, wireless devices in a link may have predetermined time periods in which they have transmit priority or may take turns having transmit priority. If a first wireless device has data to transmit in a particular TCCH to a second wireless device, the first wireless device attempts to transmit in the TCCH. Only if the first wireless device does not have data to transmit does the first wireless device refrain from utilizing the particular TCCH, thus allowing the second wireless device to use the TCCH. The resulting distribution of transmit priority may not result in the best use of resources from a QoS standpoint if one of the first and second devices is not meeting its QoS requirements based on the distribution of the transmit priority. Two distinct methods, a distributive backoff method and a token passing method, are presented infra for providing a more effective transmit priority determination within a link based on improving a QoS.

Figure 9:
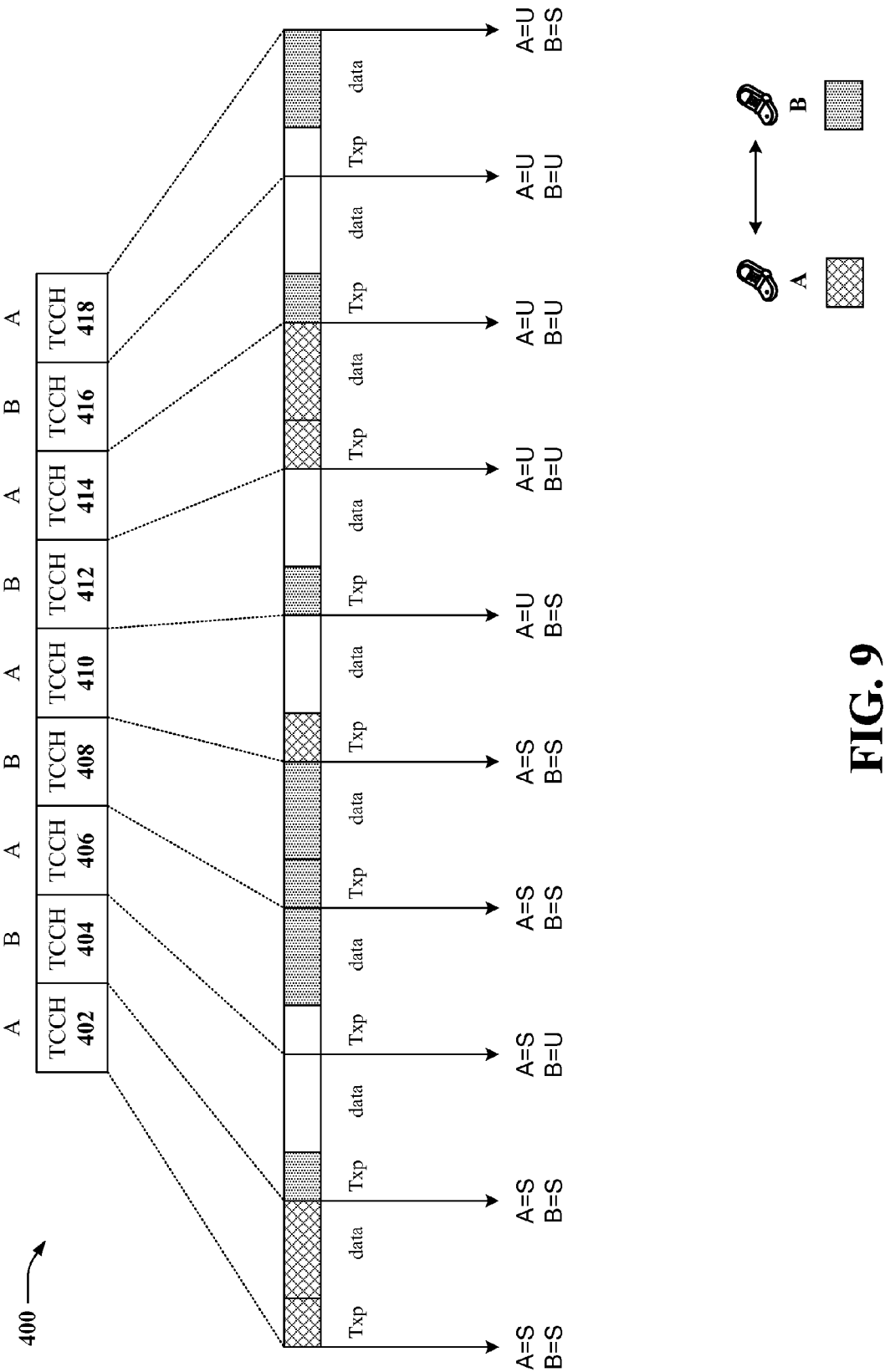
FIG. 9 is a diagram for illustrating a distributive backoff method.

FIG. 9 is a diagram 400 for illustrating a distributive backoff method. As shown in FIG. 9, the wireless device A has formed a link with the wireless device B and the wireless devices A, B form a peer-to-peer communication link. The wireless devices A, B take turns having transmit priority. The wireless device A has transmit priority in TCCHs 402, 406, 410, 414, and 418. The wireless device B has transmit priority in TCCHs 404, 408, 412, and 416. For simplicity, only the Txp and the data segments are shown for each TCCH. Furthermore, for simplicity, it is assumed that both of the wireless devices A, B have data that they can transmit in each of the TCCHs. Each of the wireless devices A, B have a QoS requirement. According to the distributive backoff method, the wireless device A forms a peer-to-peer communication link with the wireless device B. The wireless device A determines whether to transmit in its allocated assigned resource for securing a transmit priority for transfer of data to the wireless device B based on a QoS estimation of whether each associated QoS requirement is satisfied or unsatisfied. The wireless device A then transmits to the wireless device B based on the determination.

As shown in FIG. 9, at the beginning of the TCCH 402, the wireless device A determines that the QoS requirement of the wireless device A (herein "$QoS_A$") is satisfied and the QoS requirement of the wireless device B (herein "$QoS_B$") is satisfied. Because the $QoS_B$ is satisfied, the wireless device A transmits in the Txp phase to let the wireless device B know that the wireless device A has data to transmit to the wireless device B. The wireless device A transmits the data in the data segment to the wireless device B. At the beginning of the TCCH 404, the $QoS_A$ is satisfied and the $QoS_B$ is satisfied. The wireless device B transmits in the Txp phase to let the wireless device A know that the wireless device B has data to transmit to the wireless device A. However, due to yielding (Rx or Tx yielding), the wireless device B does not transmit the data in the data segment to the wireless device A.

At the beginning of the TCCH 406, the wireless device A determines that the $QoS_A$ is satisfied and the $QoS_B$ is unsatisfied. Because $QoS_A$ is satisfied and the $QoS_B$ is unsatisfied, the wireless device A refrains from (i.e., backs off from) transmitting in the Txp phase in order to allow the wireless device B to utilize the TCCH 406. The wireless device B utilizes the TCCH 406 and transmits data to the wireless device A in the data segment. At the beginning of the TCCH 408, the $QoS_A$ is satisfied and the $QoS_B$ is satisfied. The wireless device B transmits in the Txp phase to let the wireless device A know that the wireless device B has data to transmit to the wireless device A. The wireless device B transmits the data in the data segment to the wireless device A.

At the beginning of the TCCH 410, the wireless device A determines that the $QoS_A$ is satisfied and the $QoS_B$ is satisfied. Because the $QoS_B$ is satisfied, the wireless device A transmits in the Txp phase to let the wireless device B know that the wireless device A has data to transmit to the wireless device B. However, due to yielding (Rx or Tx yielding), the wireless device A does not transmit the data in the data segment to the wireless device B. At the beginning of the TCCH 412, the $QoS_A$ is unsatisfied and the $QoS_B$ is satisfied. The wireless device B transmits in the Txp phase to let the wireless device A know that the wireless device B has data to transmit to the wireless device A. However, due to yielding (Rx or Tx yielding), the wireless device B does not transmit the data in the data segment to the wireless device A. If the wireless device B were also following the distributive backoff method, the wireless device B would refrain from transmitting in the Txp of the TCCH 412 because the $QoS_A$ is unsatisfied and the $QoS_B$ is satisfied. However, in this example, it is assumed that the wireless device B is not following the distributive backoff method.

At the beginning of the TCCH 414, the wireless device A determines that both the $QoS_A$ and the $QoS_B$ are unsatisfied. In one configuration, when the $QoS_A$ is unsatisfied, the wireless device A utilizes its allocated TCCH despite whether the $QoS_B$ is satisfied or unsatisfied. In another configuration, when both the $QoS_A$ and the $QoS_B$ are unsatisfied, the wireless device A compares the $QoS_A$ and the $QoS_B$ to determine whether to utilize its allocated TCCH. For example, assuming both the $QoS_A$ and the $QoS_B$ are unsatisfied, if $QoS_A \geq QoS_B$, then the wireless device A may determine to utilize its allocated TCCH, and if $QoS_B > QoS_A$, the wireless device A may determine to refrain from utilizing its allocated TCCH. In yet another configuration, the wireless device A determines to what extent the $QoS_A$ and the $QoS_B$ are unsatisfied, and determines whether to utilize its allocated TCCH based on the determination. The determination may be a comparison of a first difference quantity $D_A$ and a second difference quantity $D_B$, where $D_A$ is a difference between a current QoS of the wireless device A and the $QoS_A$, and $D_B$ is a difference between a current QoS of the wireless device B and the $QoS_B$. More generally, the determination may be a comparison of weighted values $w_A*D_A$ and $w_B*D_B$, where $w_A$ and $w_B$ are weights to the first and second difference quantities, respectively.

The QoS may be a latency requirement, a throughput (or rate) requirement, some combination of a latency and throughput requirement, or some other QoS measurement. Assuming the QoS is a throughput requirement, the wireless device A has determined that in six TCCHs, it has transmitted in only one of them (TCCH 402), while the wireless device B has transmitted in two of them (TCCHs 406, 408). If $QoS_A$ and the $QoS_B$ are equal (e.g., 4/9 throughput requirement), the wireless device A may determine that it is farther from satisfying its own $QoS_A$ than the wireless device B is in satisfying its own $QoS_B$. As such, the wireless device A determines to transmit in the Txp phase to let the wireless device B know that the wireless device A has data to transmit to the wireless device B. The wireless device A transmits the data in the data segment to the wireless device B. At the beginning of the TCCH 416, the $QoS_A$ is unsatisfied and the $QoS_B$ is unsatisfied. The wireless device B transmits in the Txp phase to let the wireless device A know that the wireless device B has data to transmit to the wireless device A. However, due to yielding (Rx or Tx yielding), the wireless device B does not transmit the data in the data segment to the wireless device A. At the beginning of the TCCH 418, the wireless device A determines that both the $QoS_A$ and the $QoS_B$ are unsatisfied. In this case, the wireless device A determines to refrain from transmitting in the Txp phase in order to allow the wireless device B to utilize the TCCH 418. The wireless device B utilizes the TCCH 418 and transmits data to the wireless device A in the data segment.

Figure 10:
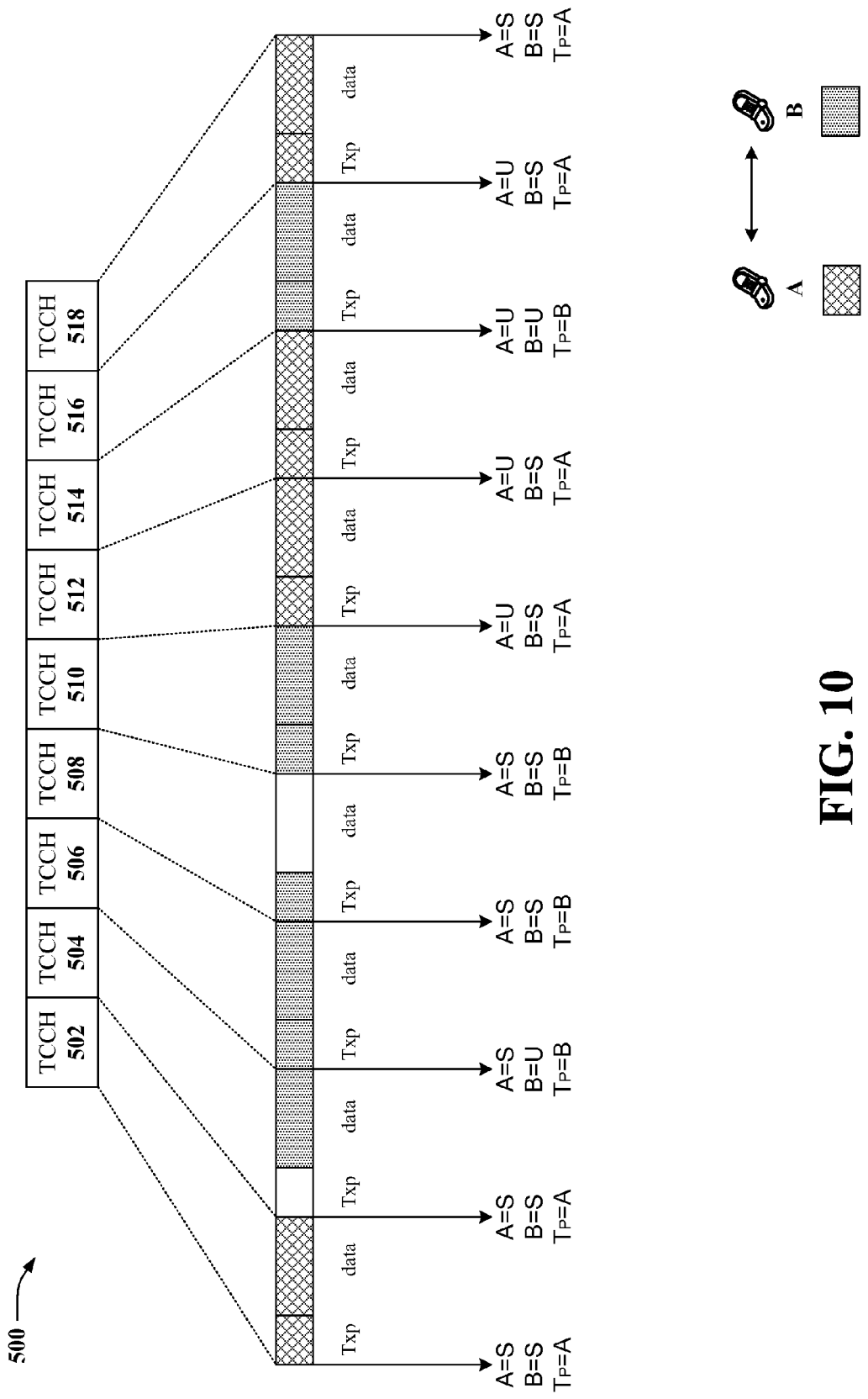
FIG. 10 is a diagram for illustrating a token passing method.

FIG. 10 is a diagram 500 for illustrating a token passing method. As shown in FIG. 10, the wireless device A has formed a link with the wireless device B and the wireless devices A, B form a peer-to-peer communication link. The wireless devices A, B do not take turns having transmit priority, but rather maintain transmit priority based on whether they hold the "token" for transmit priority. For simplicity, only the Txp and the data segments are shown for each TCCH. Each of the wireless devices A, B have a QoS requirement. According to the token passing method, the wireless device A forms a peer-to-peer communication link with the wireless device B. The wireless device A determines a transmit priority within the link based on a QoS estimation. The transmit priority is a priority of transmission between the wireless devices A, B in the link.

As shown in FIG. 10, before the TCCH 502, the wireless device A determines that both the $QoS_A$ and the $QoS_B$ are satisfied. At the TCCH 502, the wireless device A has transmit priority (i.e., has the token). Because the wireless device A has transmit priority, the wireless device A transmits in the Txp phase to let the wireless device B know that the wireless device A has data to transmit to the wireless device B and transmits the data in the data segment to the wireless device B. At the end of the TCCH 502, the wireless device A determines that both the $QoS_A$ and the $QoS_B$ are satisfied, and therefore the wireless device A maintains transmit priority. At the TCCH 504, the wireless device A has transmit priority, but does not have data to transmit, and therefore refrains from transmitting in the Txp phase in order to allow the wireless device B to utilize the TCCH 504. The wireless device B utilizes the TCCH 504 and transmits data to the wireless device A in the data segment.

At the end of the TCCH 504, the wireless device A determines that the $QoS_A$ is satisfied and the $QoS_B$ is unsatisfied. The wireless device A then determines to pass the ability to determine the transmit priority (i.e., passes the token and the ability to determine whether to keep or pass the token) to the wireless device B. At the TCCH 506, the wireless device B has transmit priority, transmits in the Txp phase to let the wireless device A know that the wireless device B has data to transmit to the wireless device A, and transmits the data in the data segment to the wireless device A. At the TCCH 508, the wireless device B has transmit priority and transmits in the Txp phase to let the wireless device A know that the wireless device B has data to transmit to the wireless device A, but does not transmit the data in the data segment to the wireless device A due to Rx or Tx yielding. At the TCCH 510, the wireless device B has transmit priority, transmits in the Txp phase to let the wireless device A know that the wireless device B has data to transmit to the wireless device A, and transmits the data in the data segment to the wireless device A. At the end of the TCCH 510, the wireless device B passes the token for transmit priority to the wireless device A.

At the end of the TCCH 510, the wireless device A determines that the $QoS_A$ is unsatisfied and the $QoS_B$ is satisfied. At the TCCH 512, the wireless device A has transmit priority. Because the wireless device A has transmit priority, the wireless device A transmits in the Txp phase to let the wireless device B know that the wireless device A has data to transmit to the wireless device B and transmits the data in the data segment to the wireless device B. At the end of the TCCH 512, the wireless device A determines that the $QoS_A$ is unsatisfied and the $QoS_B$ is satisfied. At the TCCH 514, the wireless device A has transmit priority. Because the wireless device A has transmit priority, the wireless device A transmits in the Txp phase to let the wireless device B know that the wireless device A has data to transmit to the wireless device B and transmits the data in the data segment to the wireless device B.

At the end of the TCCH 514, the wireless device A determines that both the $QoS_A$ and the $QoS_B$ are unsatisfied. When both the $QoS_A$ and the $QoS_B$ are unsatisfied, the wireless device A may determine whether to pass the transmit priority token to the wireless device B by comparing the $QoS_A$ and the $QoS_B$. For example, if $QoS_B > QoS_A$, then the wireless device A may pass the transmit priority token to the wireless device B whenever the $QoS_B$ is unsatisfied, and if $QoS_A \geq QoS_B$, then the wireless device A may pass the transmit priority token to the wireless device B only when the $QoS_A$ is satisfied and the $QoS_B$ is unsatisfied. Alternatively, the wireless device A may determine whether to pass the transmit priority token to the wireless device B by comparing to what extent the $QoS_A$ and the $QoS_B$ are unsatisfied. At the end of the TCCH 514, the wireless device A determines that the $QoS_A$ and the $QoS_B$ are unsatisfied, and based on a comparison related to the $QoS_A$ and the $QoS_B$, determines to pass the transmit priority token to the wireless device B.

At the TCCH 516, the wireless device B has transmit priority. Because the wireless device B has transmit priority, the wireless device B transmits in the Txp phase to let the wireless device A know that the wireless device B has data to transmit to the wireless device A and transmits the data in the data segment to the wireless device A. At the end of the TCCH 516, the wireless device B determines that the $QoS_A$ is unsatisfied and the $QoS_B$ is satisfied, and therefore passes the transmit priority token to the wireless device A. At TCCH 518, the wireless device A has transmit priority. Because the wireless device A has transmit priority, the wireless device A transmits in the Txp phase to let the wireless device B know that the wireless device A has data to transmit to the wireless device B and transmits the data in the data segment to the wireless device B. At the end of the TCCH 518, the wireless device A determines that the $QoS_A$ and the $QoS_B$ are satisfied.

Figure 11:
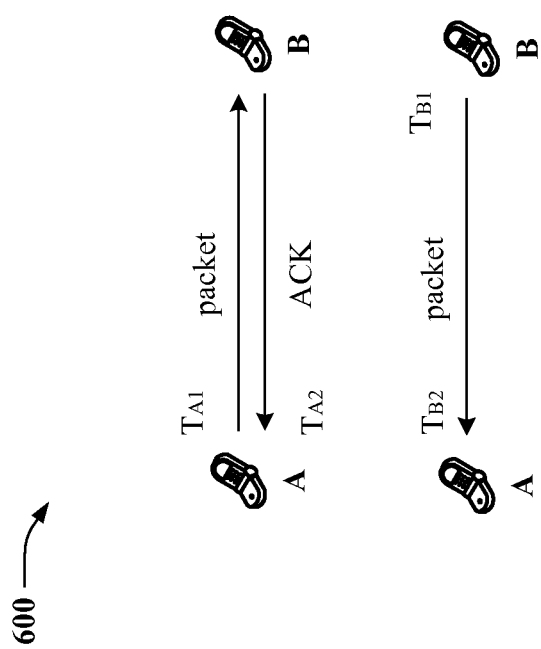
FIG. 11 is a diagram for illustrating determination of a latency QoS.

FIG. 11 is a diagram 600 for illustrating determination of a latency QoS. As discussed supra, the QoS requirement may be a latency requirement, a throughput requirement, some other QoS requirement, or any combination or weighted combination of QoS requirements. When the QoS requirement is a latency requirement, the wireless device A may determine whether it is satisfying its $QoS_A$ by determining the delay of a packet transmitted by the wireless device A. The wireless device A may determine the delay by computing the time difference $T_d$ between when a packet is sent ($T_{A1}$) and when the corresponding ACK is received ($T_{A2}$) (i.e., $T_d = T_{A2} - T_{A1}$). The wireless device B may determine whether the wireless device B is satisfying its $QoS_B$ by determining the delay of a packet transmitted by the wireless device B. The wireless device A may determine the delay of a packet transmitted by the wireless device B by computing the time difference $T_d$ between when the packet is formed ($T_{B1}$) and when the packet is received ($T_{B2}$) (i.e., $T_d = T_{B2} - T_{B1}$). The time the packet is formed ($T_{B2}$) may be in a first time stamp and the time the packet is received in a second time stamp ($T_{B2}$). The wireless device A would then determine whether the $QoS_B$ is satisfied by comparing the first and second time stamps.

Figure 12:
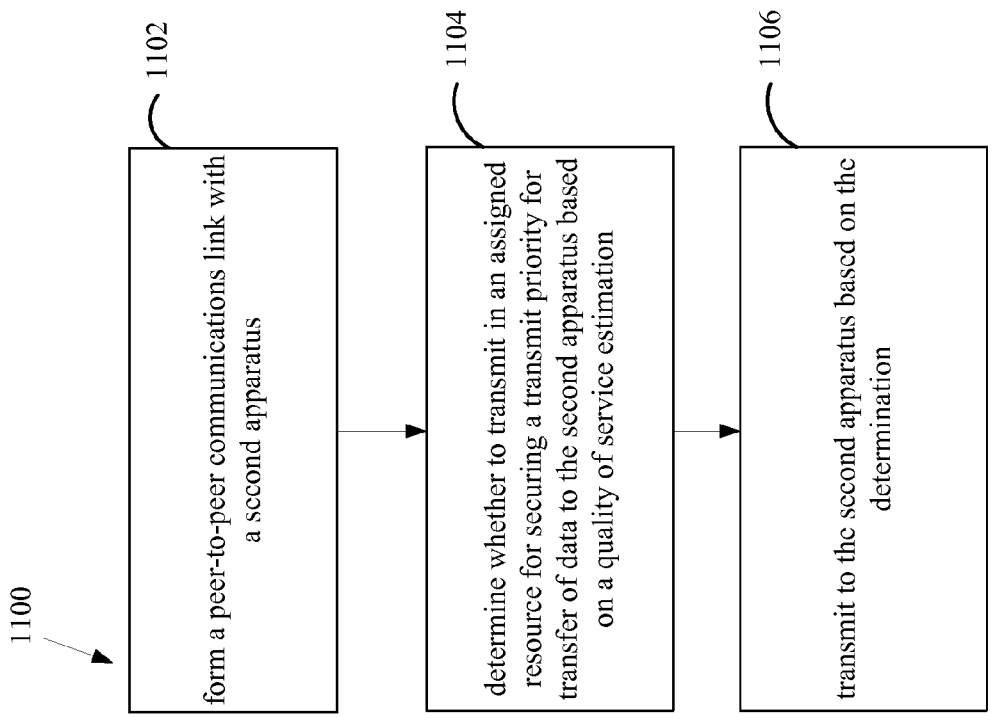
FIG. 12 is a flow chart of the distributive backoff method.

FIG. 12 is a flow chart 1100 of the distributive backoff method. The distributive backoff method may be performed by an apparatus, such as the wireless device A of FIG. 9. The apparatus forms a peer-to-peer communication link with a second apparatus (1102). In addition, the apparatus determines whether to transmit in an assigned resource (e.g., the Txp resource) for securing a transmit priority for transfer of data to the second apparatus based on a QoS estimation (1104). Furthermore, the apparatus transmits to the second apparatus in the assigned resource based on the determination (1106). In one configuration, the assigned resource is a transmit priority resource (e.g., the Txp resource) for indicating an intent to transmit the data to the second apparatus.

Figure 13:
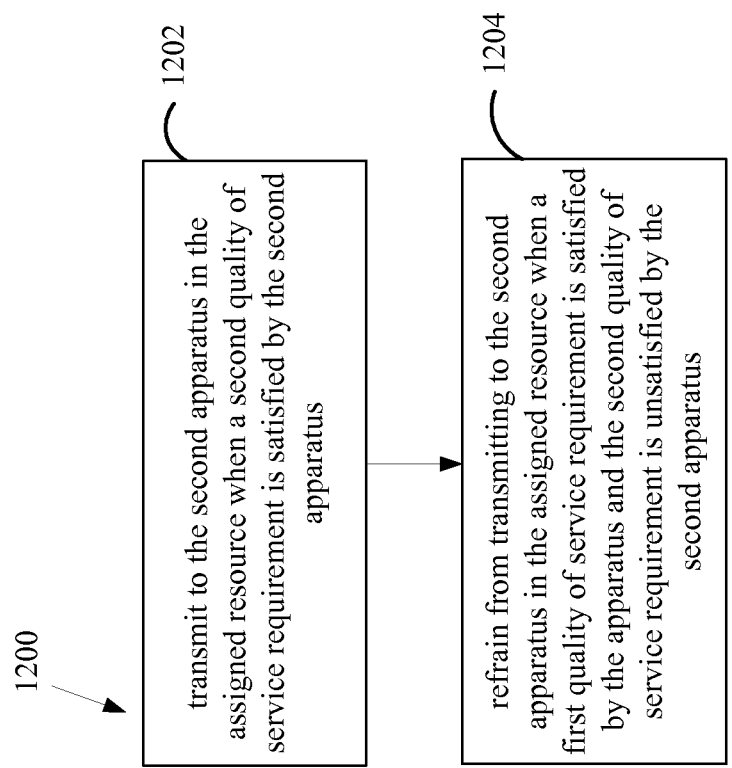
FIG. 13 is a flow chart of a first configuration of the distributive backoff method.

FIG. 13 is a flow chart 1200 of a first configuration of the distributive backoff method. In one configuration, the apparatus transmits to the second apparatus in the assigned resource based on the determination (1106) by transmitting to the second apparatus in the assigned resource when a second QoS requirement is satisfied by the second apparatus (1202), and refraining from transmitting to the second apparatus in the assigned resource when a first QoS requirement is satisfied by the apparatus and the second QoS requirement is unsatisfied by the second apparatus (1204). For example, referring again to FIG. 9, the wireless device A transmits in the Txp resource to the wireless device B in TCCHs 402, 410 when the $QoS_B$ is satisfied. In addition, the wireless device A refrains from transmitting in the Txp resource to the wireless device B in TCCH 406 when $QoS_A$ is satisfied and $QoS_B$ is unsatisfied.

Figure 14:
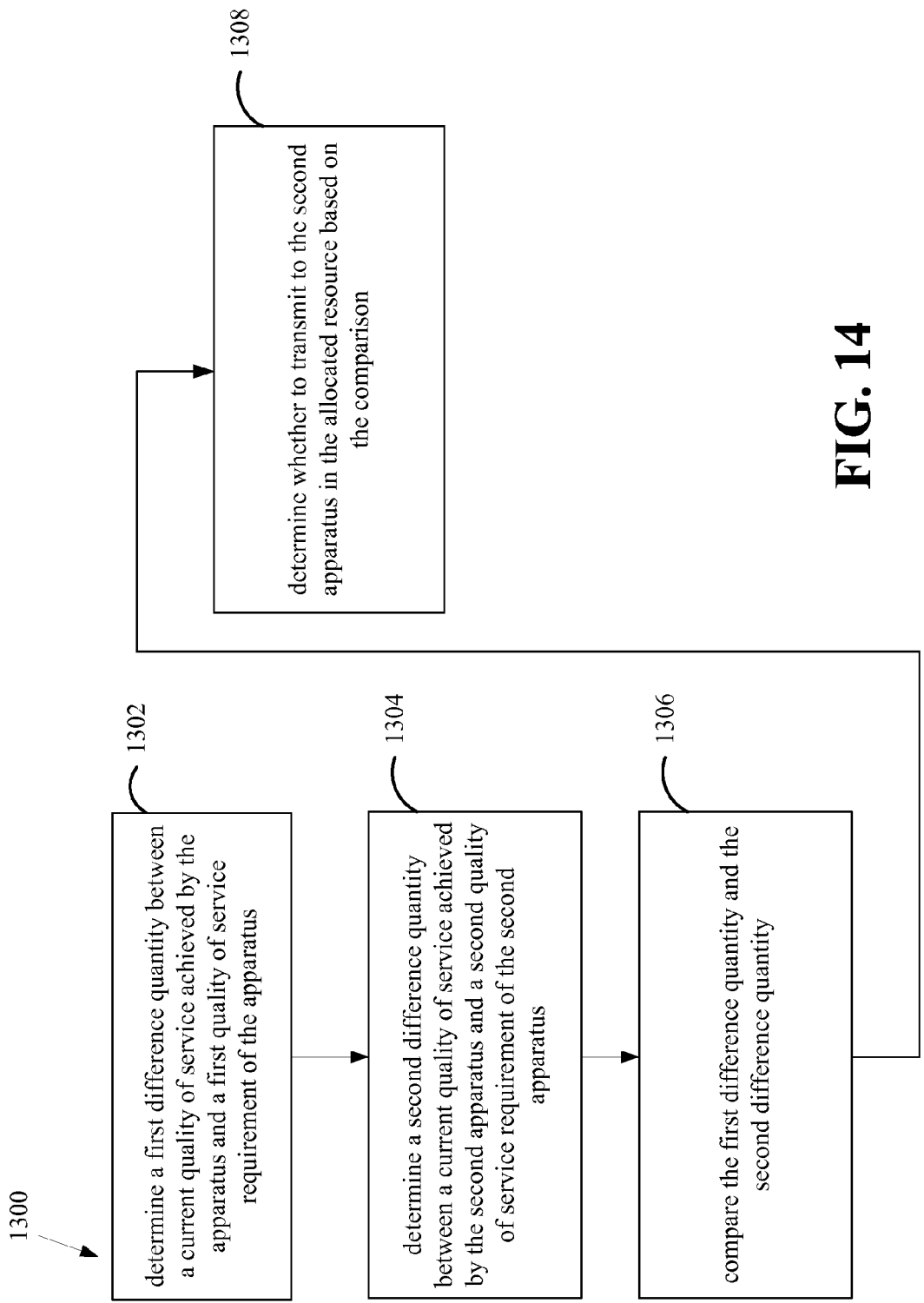
FIG. 14 is a flow chart of a second configuration of the distributive backoff method.

FIG. 14 is a flow chart 1300 of a second configuration of the distributive backoff method. In one configuration, the apparatus transmits to the second apparatus in the assigned resource based on the determination (1106) by determining a first difference quantity between a current QoS achieved by the apparatus and a first QoS requirement of the apparatus (1302), and determining a second difference quantity between a current QoS achieved by the second apparatus and a second QoS requirement of the second apparatus (1304). In addition, the apparatus compares the first difference quantity and the second difference quantity (1306). The comparison can be weighted or may be through the calculation of some value determined by a function of the first and second difference quantities. The apparatus then determines whether to transmit to the second apparatus in the allocated resource based on the comparison (1308). For example, referring again to FIG. 9, $QoS_A$ and $QoS_B$ are unsatisfied in TCCHs 414, 416. In TCCH 414, the wireless device A compared by how much $QoS_A$ was unsatisfied and by how much $QoS_B$ was unsatisfied (which may be weighted), and determined based on the comparison to transmit to the wireless device B in the Txp resource. In TCCH 416, the wireless device A compared by how much $QoS_A$ was unsatisfied and by how much $QoS_B$ was unsatisfied (which may be weighted), and determined based on the comparison to refrain from transmitting to the wireless device B in the Txp resource.

Figure 15:
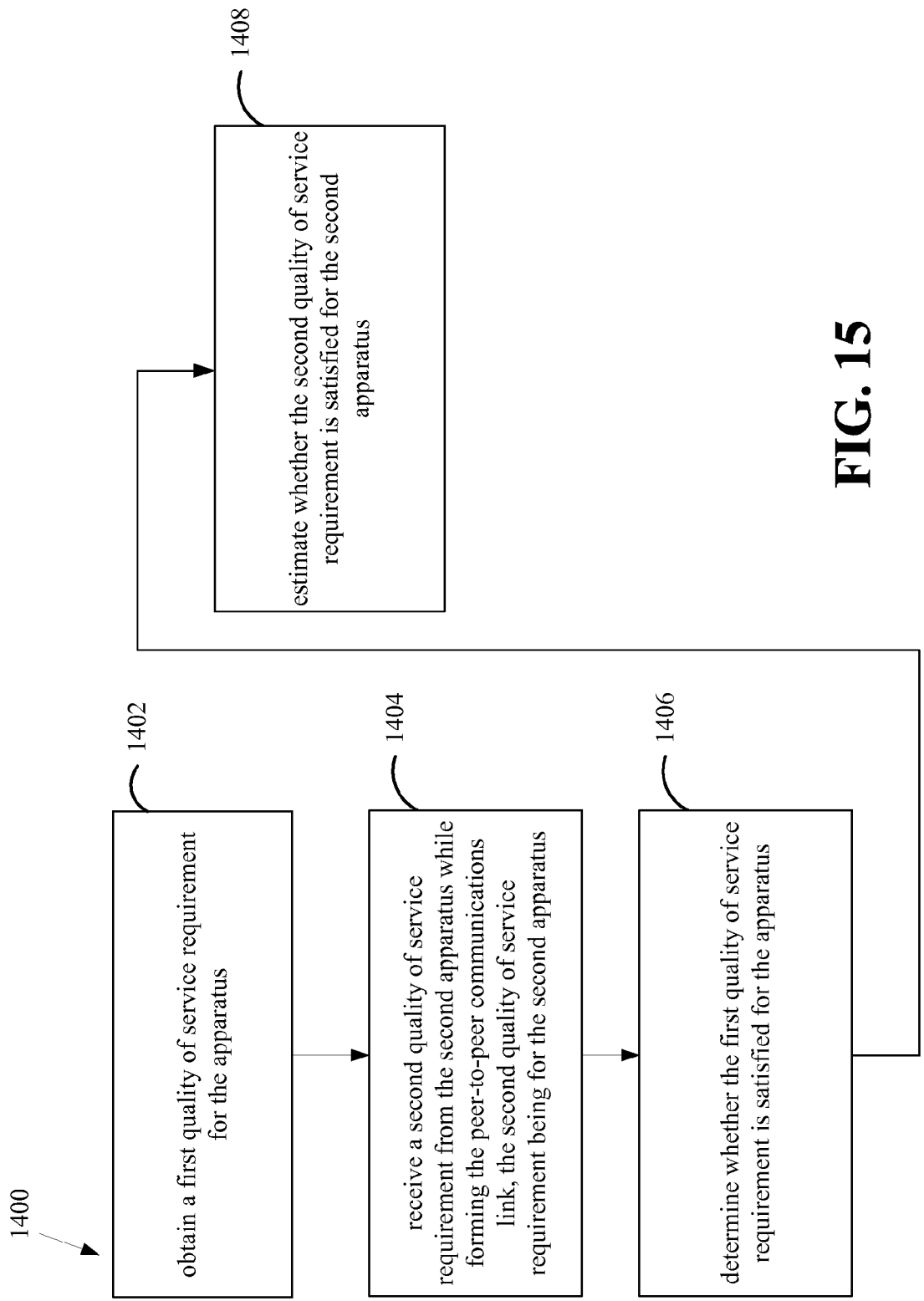
FIG. 15 is a flow chart of a third configuration of the distributive backoff method.

FIG. 15 is a flow chart 1400 of a third configuration of the distributive backoff method. In one configuration, the apparatus obtains a first QoS requirement for the apparatus (1402). In addition, the apparatus receives a second QoS requirement from the second apparatus while forming the peer-to-peer communication link (1404). The second QoS requirement is for the second apparatus. In addition, the apparatus determines whether the first QoS requirement is satisfied for the apparatus (1406). Furthermore, the apparatus estimates whether the second QoS requirement is satisfied for the second apparatus (1408). In such a configuration, the QoS estimation (in 1104) is based on a comparison of the satisfaction of the first QoS requirement by the apparatus and the satisfaction of the second QoS requirement by the second apparatus.

In one configuration, the QoS estimation (in 1104) is based on at least one of a latency requirement or a throughput requirement. In a first configuration, the QoS estimation is based on a latency requirement. In such a configuration, the apparatus determines whether the first QoS requirement is satisfied for the apparatus based on packet delays of transmitted packets. For example, the apparatus may determine the packet delay based on a difference in time between when the packet is sent and when a corresponding ACK is received for the packet. Furthermore, the apparatus estimates whether the second QoS is satisfied for the second apparatus based on a comparison of a first time stamp indicating when a data packet was formed by the second apparatus and a second time stamp indicating when the data packet was received by the apparatus. In a second configuration, the QoS estimation is based on a throughput requirement. In such a configuration, the apparatus determines whether the first QoS requirement is satisfied for the apparatus based on a number of packets successfully transmitted in a particular duration of time. Furthermore, the apparatus estimates whether the second QoS is satisfied based on a number of packets successfully received in the particular duration of time.

Figure 16:
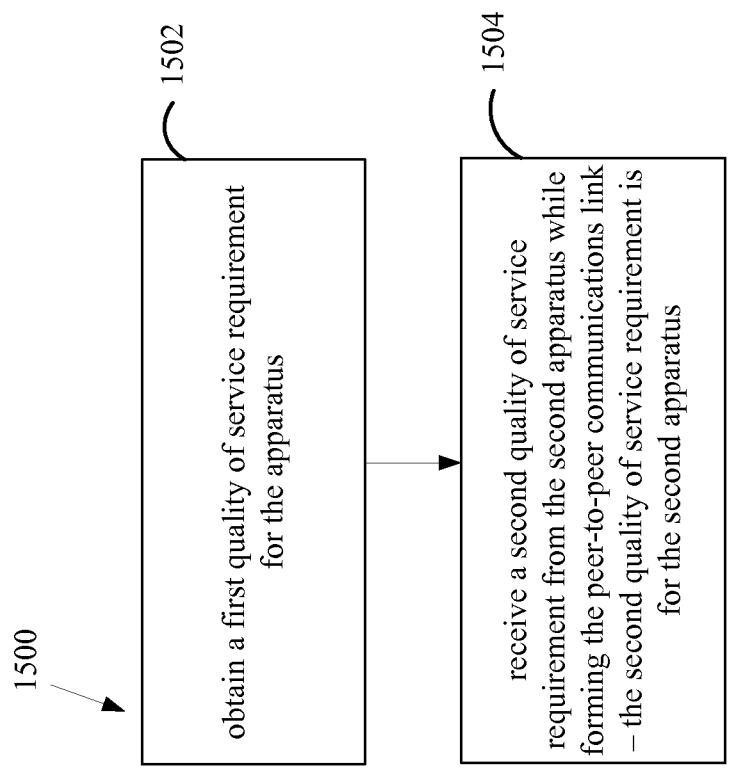
FIG. 16 is a flow chart of a fourth configuration of the distributive backoff method.

FIG. 16 is a flow chart 1500 of a fourth configuration of the distributive backoff method. In one configuration, the apparatus obtains a first QoS requirement for the apparatus (1502) and receives a second QoS requirement from the second apparatus while forming the peer-to-peer communication link (1504). The second QoS requirement is for the second apparatus. In such a configuration, the QoS estimation (in 1104) is based on a comparison of the first QoS requirement and the second QoS requirement.

As discussed supra, the apparatus may compare the $QoS_A$ and the $QoS_B$ to determine whether to transmit in the Txp resource. For example, if $QoS_A \geq QoS_B$, the apparatus may backoff from the Txp resource only when the $QoS_A$ is satisfied and the $QoS_B$ is unsatisfied, and if $QoS_A < QoS_B$, the apparatus may backoff from the Txp resource whenever the $QoS_B$ is unsatisfied, despite whether the $QoS_A$ is satisfied or unsatisfied.

Figure 17:
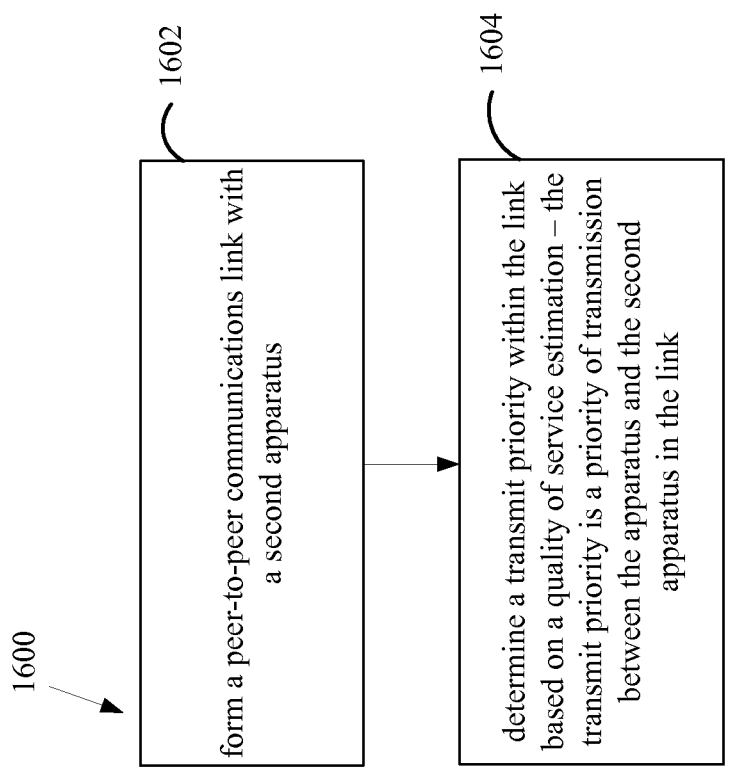
FIG. 17 is a flow chart of the token passing method.

FIG. 17 is a flow chart 1600 of the token passing method. The method may be performed by an apparatus, such as the wireless device A of FIG. 10. The apparatus forms a peer-to-peer communication link with a second apparatus (1602). In addition, the apparatus determines a transmit priority within the link based on a QoS estimation (1604). The transmit priority is a priority of transmission between the apparatus and the second apparatus in the link (1604).

Figure 18:
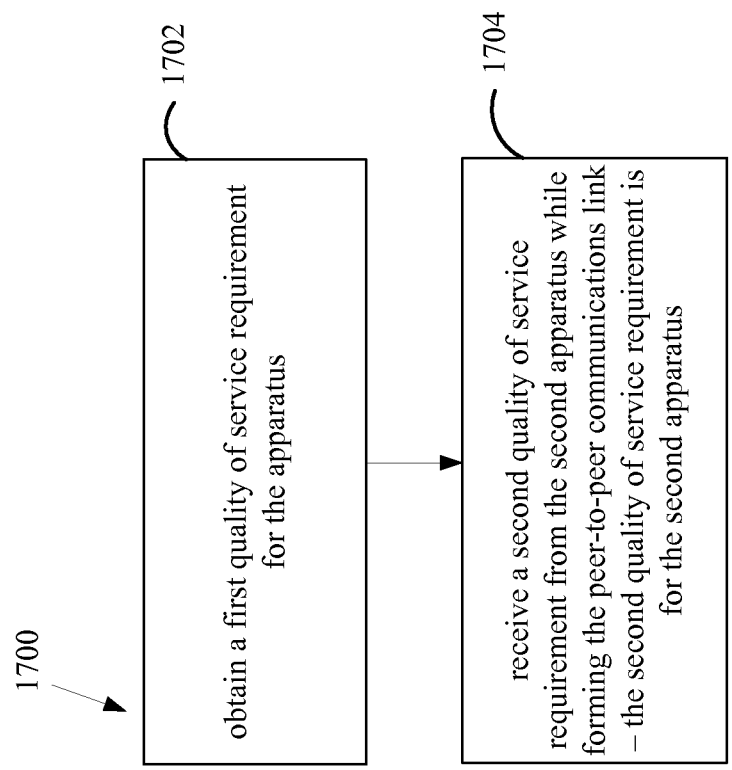
FIG. 18 is a flow chart of a first configuration of the token passing method.

FIG. 18 is a flow chart 1700 of a first configuration of the token passing method. In one configuration, the apparatus obtains a first QoS requirement for the apparatus (1702). In addition, the apparatus receives a second QoS requirement from the second apparatus while forming the peer-to-peer communication link (1704). The second QoS requirement is for the second apparatus (1704). In such a configuration, the QoS estimation (in 1604) is based on a comparison of the first QoS requirement and the second QoS requirement. For example, if $QoS_A \geq QoS_B$, the apparatus may pass the transmit priority token only when the $QoS_B$ is unsatisfied and the $QoS_A$ is satisfied, and if $QoS_A < QoS_B$, the apparatus may pass the transmit priority token whenever $QoS_B$ is unsatisfied, despite whether the $QoS_A$ is satisfied or unsatisfied.

Figure 19:
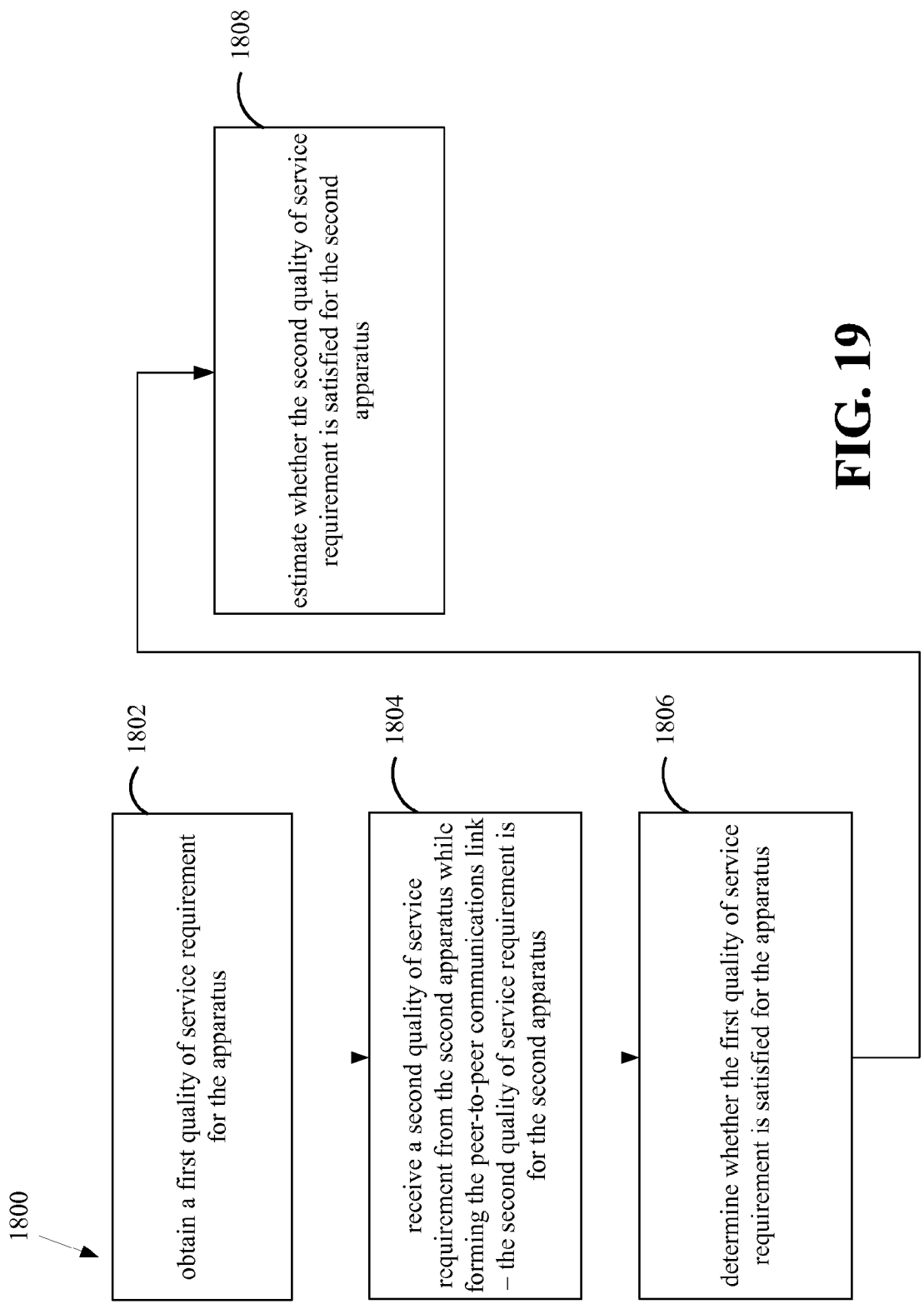
FIG. 19 is a flow chart of a second configuration of the token passing method.

FIG. 19 is a flow chart 1800 of a second configuration of the token passing method. In one configuration, the apparatus obtains a first QoS requirement for the apparatus (1802). In addition, the apparatus receives a second QoS requirement from the second apparatus while forming the peer-to-peer communication link (1804). The second QoS requirement is for the second apparatus (1804). In addition, the apparatus determines whether the first QoS requirement is satisfied for the apparatus (1806). Furthermore, the apparatus estimates whether the second QoS requirement is satisfied for the second apparatus (1808). In such a configuration, the QoS estimation (in 1604) is based on a comparison of the satisfaction of the first QoS requirement by the apparatus and the satisfaction of the second QoS requirement by the second apparatus.

For example, referring again to FIG. 10, after the TCCH 514, the wireless device A determined that both the $QoS_A$ and the $QoS_B$ are unsatisfied. The wireless device A may compare to what extent the $QoS_A$ and the $QoS_B$ are unsatisfied, and based on the comparison, determine the transmit priority between the wireless devices A, B. After the TCCH 514, the wireless device A determined that the $QoS_B$ is more unsatisfied than the $QoS_A$ (which may be based on some weighted function), and therefore to pass the transmit priority token to the wireless device B.

As mentioned supra, the QoS may be based on latency, throughput, other QoS factors, or any weighted or non-weighted combination of these. In one configuration, the apparatus determines whether the first QoS requirement is satisfied for the apparatus based on packet delays of transmitted packets, and estimates whether the second QoS is satisfied for the second apparatus based on a comparison of a first time stamp indicating when a data packet was formed by the second apparatus and a second time stamp indicating when the data packet was received by the apparatus. In another configuration, the apparatus determines whether the first QoS requirement is satisfied for the apparatus based on a number of packets successfully transmitted in a particular duration of time, and estimates whether the second QoS is satisfied for the second apparatus based on a number of packets successfully received in the particular duration of time.

Figure 20:
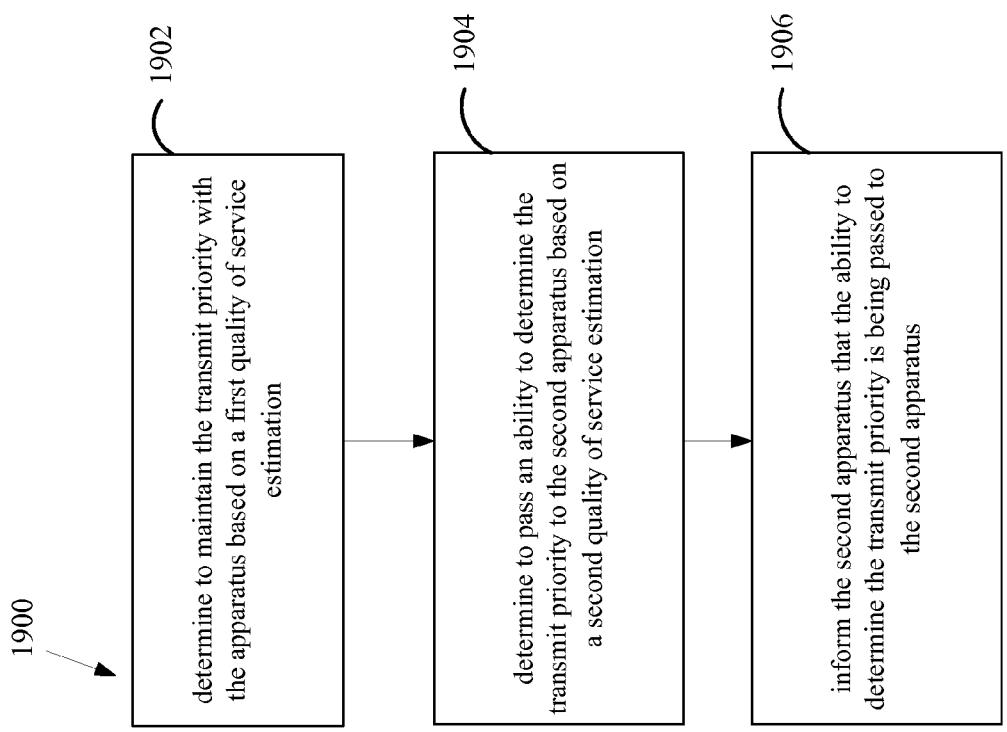
FIG. 20 is a flow chart of a third configuration of the token passing method.

FIG. 20 is a flow chart 1900 of a third configuration of the token passing method. In one configuration, the apparatus determines to maintain the transmit priority with the apparatus based on a first QoS estimation (1902). In addition, the apparatus determines to pass an ability to determine the transmit priority to the second apparatus based on a second QoS estimation (1904). When the apparatus determines to pass the transmit priority token, the apparatus informs the second apparatus that the ability to determine the transmit priority is being passed to the second apparatus (1906).

For example, after TCCHs 502, 512, 518, the wireless device A determined to keep the transmit priority token based on a first QoS estimation. The first estimation may be based on a comparison of the satisfaction/unsatisfaction of the $QoS_A$ and the $QoS_B$, and when the satisfaction/unsatisfaction of the $QoS_A$ and the $QoS_B$ indicate a potential passing of the transmit priority token, a comparison of the $QoS_A$ and the $QoS_B$ and/or a comparison of an extent by which the $QoS_A$ and the $QoS_B$ are satisfied/unsatisfied. Further, after TCCHs 504, 514, the apparatus determined to pass the transmit priority token to the wireless device B based on a second QoS estimation. The second estimation may based on a comparison of the satisfaction/unsatisfaction of the $QoS_A$ and the $QoS_B$, and when the satisfaction/unsatisfaction of the $QoS_A$ and the $QoS_B$ indicate a potential passing of the transmit priority token, a comparison of the $QoS_A$ and the $QoS_B$ and/or a comparison of an extent by which the $QoS_A$ and the $QoS_B$ are satisfied/unsatisfied. After the TCCHs 504, 514, when the wireless device A determined to pass the transmit priority token to the wireless device B, the wireless device A informed the wireless device B that the wireless device B has possession of the transmit priority token.

Figure 21:
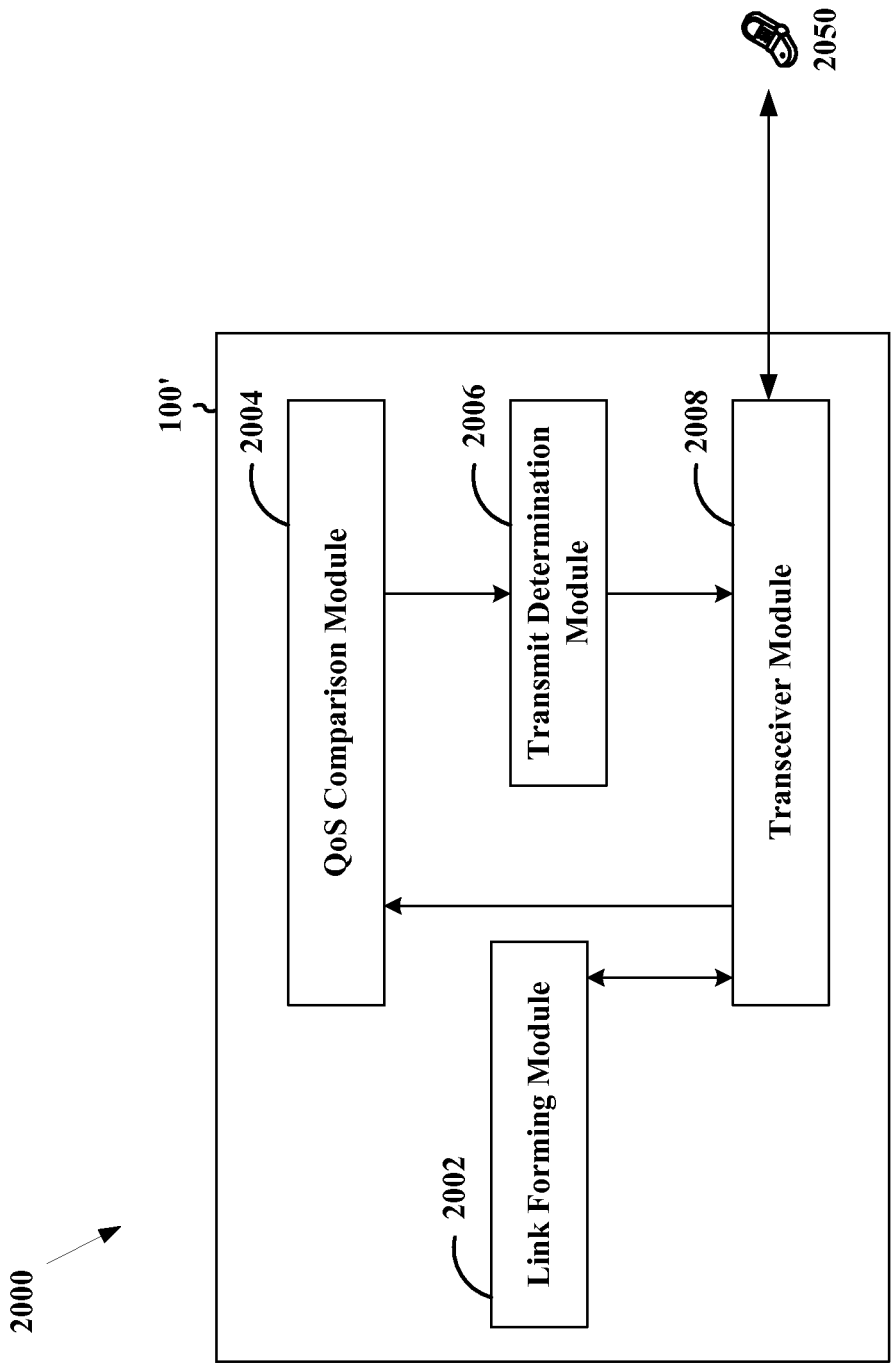
FIG. 21 is a conceptual block diagram illustrating the functionality of an exemplary apparatus.

FIG. 21 is a conceptual block diagram illustrating the functionality of an exemplary apparatus 100'. In one configuration, the apparatus 100' includes a link forming module 2002 that is configured to form a peer-to-peer communication link with a second apparatus 2050. The apparatus 100' may further include a transmit determination module 2006 that is configured to determine whether to transmit in an assigned resource for securing a transmit priority for transfer of data to the second apparatus 2050 based on a QoS estimation. Alternatively, the apparatus 100' may further include a transmit determination module 2006 that is configured to determine a transmit priority within the link based on a QoS estimation. The transmit priority is a priority of transmission between the apparatus and the second apparatus in the link. The apparatus 100' may further include a transceiver module 2008 that is configured to transmit to the second apparatus 2050 in the assigned resource based on the determination. The apparatus 100' may further include a QoS comparison module 2004 for comparing QoS requirements and/or an extent to which the QoS requirements are satisfied/unsatisfied. The apparatus 100' may include additional modules that perform each of the steps in the aforementioned flow charts. As such, each step in the aforementioned flow charts may be performed by a module and the apparatus 100 may include one or more of those modules.

Referring to FIG. 1 and FIG. 21, an apparatus 100/100' for handing the distributive backoff includes means for forming a peer-to-peer communication link with a second apparatus, means for determining whether to transmit in an assigned resource for securing a transmit priority for transfer of data to the second apparatus based on a QoS estimation, and means for transmitting to the second apparatus in the assigned resource based on the determination. In one configuration, the apparatus includes means for obtaining a first QoS requirement for the apparatus; means for receiving a second QoS requirement from the second apparatus while forming the peer-to-peer communication link, the second QoS requirement being for the second apparatus; means for determining whether the first QoS requirement is satisfied for the apparatus; and means for estimating whether the second QoS requirement is satisfied for the second apparatus. In such a configuration, the QoS estimation is based on a comparison of the satisfaction of the first QoS requirement by the apparatus and the satisfaction of the second QoS requirement by the second apparatus. In one configuration, the apparatus includes means for obtaining a first QoS requirement for the apparatus; and means for receiving a second QoS requirement from the second apparatus while forming the peer-to-peer communication link, the second QoS requirement being for the second apparatus. In such a configuration, the QoS estimation is based on a comparison of the first QoS requirement and the second QoS requirement. The aforementioned means is the processing system 114 of the apparatus 100 and/or one or more modules of the apparatus 100' configured to perform the functions recited by the aforementioned means.

An apparatus 100/100' for handing the token passing includes means for forming a peer-to-peer communication link with a second apparatus; and means for determining a transmit priority within the link based on a QoS estimation, the transmit priority being a priority of transmission between the apparatus and the second apparatus in the link. In one configuration, the apparatus further includes means for obtaining a first QoS requirement for the apparatus; and means for receiving a second QoS requirement from the second apparatus while forming the peer-to-peer communication link, the second QoS requirement being for the second apparatus. In such a configuration, the QoS estimation is based on a comparison of the first QoS requirement and the second QoS requirement. In one configuration, the apparatus further includes means for obtaining a first QoS requirement for the apparatus; means for receiving a second QoS requirement from the second apparatus while forming the peer-to-peer communication link, the second QoS requirement being for the second apparatus; means for determining whether the first QoS requirement is satisfied for the apparatus; and means for estimating whether the second QoS requirement is satisfied for the second apparatus. In such a configuration, the QoS estimation is based on a comparison of the satisfaction of the first QoS requirement by the apparatus and the satisfaction of the second QoS requirement by the second apparatus. In one configuration, the apparatus further includes means for determining to maintain the transmit priority with the apparatus based on a first QoS estimation; means for determining to pass an ability to determine the transmit priority to the second apparatus based on a second QoS estimation; and means for informing the second apparatus that the ability to determine the transmit priority is being passed to the second apparatus. The aforementioned means is the processing system 114 of the apparatus 100 and/or one or more modules of the apparatus 100' configured to perform the functions recited by the aforementioned means.

It is understood that the specific order or hierarchy of steps in the processes disclosed is an illustration of exemplary approaches. Based upon design preferences, it is understood that the specific order or hierarchy of steps in the processes may be rearranged. The accompanying method claims present elements of the various steps in a sample order, and are not meant to be limited to the specific order or hierarchy presented.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language claims, wherein reference to an element in the singular is not intended to mean "one and only one" unless specifically so stated, but rather "one or more." Unless specifically stated otherwise, the term "some" refers to one or more. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed as a means plus function unless the element is expressly recited using the phrase "means for."

What is claimed is:

1. A method of an apparatus for wireless communication, comprising:

forming a peer-to-peer communication link with a second apparatus;

determining whether the apparatus has a transmit priority over the second apparatus in the peer-to-peer communication link;

determining, upon determining the apparatus has transmit priority over the second apparatus, whether to transmit in an assigned resource for securing the transmit priority over the second apparatus in the peer-to-peer communication link for transfer of data to the second apparatus based on a quality of service estimation, the assigned resource being in a first subset of contention resources of a set of contention resources, wherein the apparatus transmits in the assigned resource to indicate an intention to secure the transmit priority over the second apparatus in the peer-to-peer communication link; and transmitting to the second apparatus in the assigned resource based on the determination of whether to transmit in the assigned resources;

wherein the quality of service estimation is obtained by:

obtaining a first quality of service requirement for the apparatus;

receiving a second quality of service requirement from the second apparatus while forming the peer-to-peer communication link, the second quality of service requirement being for the second apparatus;

determining whether the first quality of service requirement is satisfied for the apparatus; and estimating whether the second quality of service requirement is satisfied for the second apparatus, wherein the quality of service estimation is based on a comparison of the satisfaction of the first quality of service requirement by the apparatus and the satisfaction of the second quality of service requirement by the second apparatus.

2. The method of claim 1, wherein the transmitting to the second apparatus in the assigned resource based on the determination comprises:

transmitting to the second apparatus in the assigned resource when a second quality of service requirement is satisfied by the second apparatus; and refraining from transmitting to the second apparatus in the assigned resource when a first quality of service requirement is satisfied by the apparatus and the second quality of service requirement is unsatisfied by the second apparatus.

3. The method of claim 1, wherein the transmitting to the second apparatus in the assigned resource based on the determination comprises:

determining a first difference quantity between a current quality of service achieved by the apparatus and a first quality of service requirement of the apparatus;

determining a second difference quantity between a current quality of service achieved by the second apparatus and a second quality of service requirement of the second apparatus; comparing the first difference quantity and the second difference quantity; and determining whether to transmit to the second apparatus based on the comparison.

4. The method of claim 1, wherein the quality of service estimation is based on at least one of a latency requirement or a throughput requirement.

5. The method of claim 4, wherein:
the quality of service estimation is based on said latency requirement;
the determining whether the first quality of service requirement is satisfied for the apparatus is based on packet delays of transmitted packets; and
the estimating whether the second quality of service requirement is satisfied for the second apparatus is based on a comparison of a first time stamp indicating when a data packet was formed by the second apparatus and a second time stamp indicating when the data packet was received by the apparatus.

6. The method of claim 4, wherein:
the quality of service estimation is based on said throughput requirement;
the determining whether the first quality of service requirement is satisfied for the apparatus is based on a number of packets successfully transmitted in a particular duration of time; and
the estimating whether the second quality of service requirement is satisfied is based on a number of packets successfully received in the particular duration of time.

7. The method of claim 1, further comprising:
obtaining a first quality of service requirement for the apparatus; and
receiving a second quality of service requirement from the second apparatus while forming the peer-to-peer communication link, the second quality of service requirement being for the second apparatus,
wherein the quality of service estimation is based on a comparison of the first quality of service requirement and the second quality of service requirement.

8. The method of claim 1, wherein the assigned resource is a transmit priority resource for indicating an intent to transmit the data to the second apparatus.

9. A method of an apparatus for wireless communication, comprising:
forming a peer-to-peer communication link with a second apparatus;
determining a transmit priority as between the apparatus and the second apparatus within the peer-to-peer communication link based on a quality of service estimation, the transmit priority being a priority of transmission between the apparatus and the second apparatus in the peer-to-peer communication link; and
determining whether to transmit in an assigned resource based at least on the determination of the transmit priority, the assigned resource being in a first subset of contention resources of a set of contention resources,
wherein the transmit priority indicates whether the apparatus has the priority of transmission over the second apparatus to transmit data in the peer-to-peer communication link;

wherein the quality of service estimation is obtained by:
obtaining a first quality of service requirement for the apparatus;
receiving a second quality of service requirement from the second apparatus while forming the peer-to-peer communication link, the second quality of service requirement being for the second apparatus;
determining whether the first quality of service requirement is satisfied for the apparatus; and
estimating whether the second quality of service requirement is satisfied for the second apparatus,
wherein the quality of service estimation is based on a comparison of the satisfaction of the first quality of service requirement by the apparatus and the satisfaction of the second quality of service requirement by the second apparatus.

10. The method of claim 9, further comprising:
obtaining a first quality of service requirement for the apparatus; and
receiving a second quality of service requirement from the second apparatus while forming the peer-to-peer communication link, the second quality of service requirement being for the second apparatus,
wherein the quality of service estimation is based on a comparison of the first quality of service requirement and the second quality of service requirement.

11. The method of claim 9, wherein the determining whether the first quality of service requirement is satisfied for the apparatus is based on packet delays of transmitted packets, and the estimating whether the second quality of service requirement is satisfied for the second apparatus is based on a comparison of a first time stamp indicating when a data packet was formed by the second apparatus and a second time stamp indicating when the data packet was received by the apparatus.

12. The method of claim 9, wherein the determining whether the first quality of service requirement is satisfied for the apparatus is based on a number of packets successfully transmitted in a particular duration of time, and the estimating whether the second quality of service requirement is satisfied for the second apparatus is based on a number of packets successfully received in the particular duration of time.

13. The method of claim 9, further comprising:
determining to maintain the transmit priority with the apparatus based on a first quality of service estimation;
determining to pass an ability to determine the transmit priority to the second apparatus based on a second quality of service estimation; and
informing the second apparatus that the ability to determine the transmit priority is being passed to the second apparatus.

14. An apparatus for wireless communication, comprising:
means for forming a peer-to-peer communication link with a second apparatus;
means for determining whether the apparatus has a transmit priority over the second apparatus in the peer-to-peer communication link;
means for determining, upon determining the apparatus has transmit priority over the second apparatus, whether to transmit in an assigned resource for securing the transmit priority over the second apparatus in the peer-to-peer communication link for transfer of data to the second apparatus based on a quality of service estimation, the assigned resource being in a first subset of contention resources of a set of contention resources,
wherein the apparatus transmits in the assigned resource to indicate an intention to secure the transmit priority over the second apparatus in the peer-to-peer communication link; and means for transmitting to the second apparatus in the assigned resource based on the determination of whether to transmit in the assigned resources;

wherein the quality of service estimation is obtained by:

means for obtaining a first quality of service requirement for the apparatus;

means for receiving a second quality of service requirement from the second apparatus while forming the peer-to-peer communication link, the second quality of service requirement being for the second apparatus;

means for determining whether the first quality of service requirement is satisfied for the apparatus; and means for estimating whether the second quality of service requirement is satisfied for the second apparatus, wherein the quality of service estimation is based on a comparison of the satisfaction of the first quality of service requirement by the apparatus and the satisfaction of the second quality of service requirement by the second apparatus.

15. The apparatus of claim 14, wherein the means for transmitting to the second apparatus in the assigned resource based on the determination is configured to:

transmit to the second apparatus in the assigned resource when a second quality of service requirement is satisfied by the second apparatus; and refrain from transmitting to the second apparatus in the assigned resource when a first quality of service requirement is satisfied by the apparatus and the second quality of service requirement is unsatisfied by the second apparatus.

16. The apparatus of claim 14, wherein the means for transmitting to the second apparatus in the assigned resource based on the determination is configured to:

determine a first difference quantity between a current quality of service achieved by the apparatus and a first quality of service requirement of the apparatus;

determine a second difference quantity between a current quality of service achieved by the second apparatus and a second quality of service requirement of the second apparatus;

compare the first difference quantity and the second difference quantity; and determine whether to transmit to the second apparatus based on the comparison.

17. The apparatus of claim 14, wherein the quality of service estimation is based on at least one of a latency requirement or a throughput requirement.

18. The apparatus of claim 17, wherein:

the quality of service estimation is based on said latency requirement;

the means for determining whether the first quality of service requirement is satisfied for the apparatus performs the determination based on packet delays of transmitted packets; and the means for estimating whether the second quality of service requirement is satisfied for the second apparatus performs the estimation based on a comparison of a first time stamp indicating when a data packet was formed by the second apparatus and a second time stamp indicating when the data packet was received by the apparatus.

19. The apparatus of claim 17, wherein:

the quality of service estimation is based on said throughput requirement;

the means for determining whether the first quality of service requirement is satisfied for the apparatus performs the determination based on a number of packets successfully transmitted in a particular duration of time; and the means for estimating whether the second quality of service requirement is satisfied performs the estimation based on a number of packets successfully received in the particular duration of time.

20. The apparatus of claim 14, further comprising:

the means for obtaining a first quality of service requirement for the apparatus; and the means for receiving a second quality of service requirement from the second apparatus while forming the peer-to-peer communication link, the second quality of service requirement being for the second apparatus, wherein the quality of service estimation is based on a comparison of the first quality of service requirement and the second quality of service requirement.

21. The apparatus of claim 14, wherein the assigned resource is a transmit priority resource for indicating an intent to transmit the data to the second apparatus.

22. An apparatus for wireless communication, comprising:

means for forming a peer-to-peer communication link with a second apparatus;

means for determining a transmit priority as between the apparatus and the second apparatus within the peer-to-peer communication link based on a quality of service estimation, the transmit priority being a priority of transmission between the apparatus and the second apparatus in the peer-to-peer communication link; and means for determining whether to transmit in an assigned resource based at least on the determination of the transmit priority, the assigned resource being in a first subset of contention resources of a set of contention resources, wherein the transmit priority indicates whether the apparatus has the priority of transmission over the second apparatus to transmit data in the peer-to-peer communication link;

wherein the quality of service estimation is obtained by:

means for obtaining a first quality of service requirement for the apparatus;

means for receiving a second quality of service requirement from the second apparatus while forming the peer-to-peer communication link, the second quality of service requirement being for the second apparatus;

means for determining whether the first quality of service requirement is satisfied for the apparatus; and means for estimating whether the second quality of service requirement is satisfied for the second apparatus, wherein the quality of service estimation is based on a comparison of the satisfaction of the first quality of service requirement by the apparatus and the satisfaction of the second quality of service requirement by the second apparatus.

23. The apparatus of claim 22, further comprising:

the means for obtaining a first quality of service requirement for the apparatus; and the means for receiving a second quality of service requirement from the second apparatus while forming the peer-to-peer communication link, the second quality of service requirement being for the second apparatus, wherein the quality of service estimation is based on a comparison of the first quality of service requirement and the second quality of service requirement.

24. The apparatus of claim 22, wherein the means for determining whether the first quality of service requirement is satisfied for the apparatus performs the determination based on packet delays of transmitted packets, and the means for estimating whether the second quality of service requirement is satisfied for the second apparatus performs the estimation based on a comparison of a first time stamp indicating when a data packet was formed by the second apparatus and a second time stamp indicating when the data packet was received by the apparatus.

25. The apparatus of claim 22, wherein the means for determining whether the first quality of service requirement is satisfied for the apparatus performs the determination based on a number of packets successfully transmitted in a particular duration of time, and the means for estimating whether the second quality of service requirement is satisfied for the second apparatus performs the estimation based on a number of packets successfully received in the particular duration of time.

26. The apparatus of claim 22, further comprising:
the means for determining to maintain the transmit priority with the apparatus based on a first quality of service estimation;
the means for determining to pass an ability to determine the transmit priority to the second apparatus based on a second quality of service estimation; and
means for informing the second apparatus that the ability to determine the transmit priority is being passed to the second apparatus.

27. An apparatus for wireless communication, comprising:
a processing system configured to:
form a peer-to-peer communication link with a second apparatus;
determine whether the apparatus has a transmit priority over the second apparatus in the peer-to-peer communication link;
determine, upon determining the apparatus has transmit priority over the second apparatus, whether to transmit in an assigned resource for securing the transmit priority over the second apparatus in the peer-to-peer communication link for transfer of data to the second apparatus based on a quality of service estimation, the assigned resource being in a first subset of contention resources of a set of contention resources, wherein the apparatus transmits in the assigned resource to indicate an intention to secure the transmit priority over the second apparatus in the peer-to-peer communication link; and
transmit to the second apparatus in the assigned resource based on the determination of whether to transmit in the assigned resource;
wherein the quality of service estimation is obtained by:
obtain a first quality of service requirement for the apparatus;
receive a second quality of service requirement from the second apparatus while forming the peer-to-peer communication link, the second quality of service requirement being for the second apparatus;
determine whether the first quality of service requirement is satisfied for the apparatus; and
estimate whether the second quality of service requirement is satisfied for the second apparatus,
wherein the quality of service estimation is based on a comparison of the satisfaction of the first quality of service requirement by the apparatus and the satisfaction of the second quality of service requirement by the second apparatus.

28. The apparatus of claim 27, wherein the processing system is configured to transmit to the second apparatus in the assigned resource based on the determination by:
transmitting to the second apparatus in the assigned resource when a second quality of service requirement is satisfied by the second apparatus; and
refraining from transmitting to the second apparatus in the assigned resource when a first quality of service requirement is satisfied by the apparatus and the second quality of service requirement is unsatisfied by the second apparatus.

29. The apparatus of claim 27, wherein the processing system is configured to transmit to the second apparatus in the assigned resource based on the determination by:
determining a first difference quantity between a current quality of service achieved by the apparatus and a first quality of service requirement of the apparatus;
determining a second difference quantity between a current quality of service achieved by the second apparatus and a second quality of service requirement of the second apparatus;
comparing the first difference quantity and the second difference quantity; and determining whether to transmit to the second apparatus based on the comparison.

30. The apparatus of claim 27, wherein the quality of service estimation is based on at least one of a latency requirement or a throughput requirement.

31. The apparatus of claim 30, wherein:
the quality of service estimation is based on said latency requirement;
the processing system is configured to determine whether the first quality of service requirement is satisfied for the apparatus based on packet delays of transmitted packets; and
the processing system is configured to estimate whether the second quality of service requirement is satisfied for the second apparatus based on a comparison of a first time stamp indicating when a data packet was formed by the second apparatus and a second time stamp indicating when the data packet was received by the apparatus.

32. The apparatus of claim 30, wherein:
the quality of service estimation is based on said throughput requirement;
the processing system is configured to determine whether the first quality of service requirement is satisfied for the apparatus is based on a number of packets successfully transmitted in a particular duration of time; and
the processing system is configured to estimate whether the second quality of service requirement is satisfied based on a number of packets successfully received in the particular duration of time.

33. The apparatus of claim 27, wherein the processing system is further configured to:
obtain a first quality of service requirement for the apparatus; and
receive a second quality of service requirement from the second apparatus while forming the peer-to-peer communication link, the second quality of service requirement being for the second apparatus,
wherein the quality of service estimation is based on a comparison of the first quality of service requirement and the second quality of service requirement.

34. The apparatus of claim 27, wherein the assigned resource is a transmit priority resource for indicating an intent to transmit the data to the second apparatus.

35. An apparatus for wireless communication, comprising:
a processing system configured to:
form a peer-to-peer communication link with a second apparatus;

determine a transmit priority as between the apparatus and the second apparatus within the peer-to-peer communication link based on a quality of service estimation, the transmit priority being a priority of transmission between the apparatus and the second apparatus in the peer-to-peer communication link; and determine whether to transmit in an assigned resource based at least on the determination of the transmit priority, the assigned resource being in a first subset of contention resources of a set of contention resources, wherein the transmit priority indicates whether the apparatus has the priority of transmission over the second apparatus to transmit data in the peer-to-peer communication link;

wherein the quality of service estimation is obtained by:

obtain a first quality of service requirement for the apparatus;

receive a second quality of service requirement from the second apparatus while forming the peer-to-peer communication link, the second quality of service requirement being for the second apparatus;

determine whether the first quality of service requirement is satisfied for the apparatus; and estimate whether the second quality of service requirement is satisfied for the second apparatus, wherein the quality of service estimation is based on a comparison of the satisfaction of the first quality of service requirement by the apparatus and the satisfaction of the second quality of service requirement by the second apparatus.

36. The apparatus of claim 35, wherein the processing system is further configured to:

obtain a first quality of service requirement for the apparatus; and receive a second quality of service requirement from the second apparatus while forming the peer-to-peer communication link, the second quality of service requirement being for the second apparatus, wherein the quality of service estimation is based on a comparison of the first quality of service requirement and the second quality of service requirement.

37. The apparatus of claim 35, wherein the processing system is configured to determine whether the first quality of service requirement is satisfied for the apparatus based on packet delays of transmitted packets, and to estimate whether the second quality of service requirement is satisfied for the second apparatus based on a comparison of a first time stamp indicating when a data packet was formed by the second apparatus and a second time stamp indicating when the data packet was received by the apparatus.

38. The apparatus of claim 35, wherein the processing system is configured to determine whether the first quality of service requirement is satisfied for the apparatus based on a number of packets successfully transmitted in a particular duration of time, and to estimate whether the second quality of service requirement is satisfied for the second apparatus based on a number of packets successfully received in the particular duration of time.

39. The apparatus of claim 35, wherein the processing system is further configured to:

determine to maintain the transmit priority with the apparatus based on a first quality of service estimation;

determine to pass an ability to determine the transmit priority to the second apparatus based on a second quality of service estimation; and inform the second apparatus that the ability to determine the transmit priority is being passed to the second apparatus.

40. A computer program product in an apparatus for wireless communication, comprising:

a non-transitory computer-readable medium comprising code for:

forming a peer-to-peer communication link with a second apparatus;

determining whether the apparatus has a transmit priority over the second apparatus in the peer-to-peer communication link;

determining, upon determining the apparatus has transmit priority over the second apparatus, whether to transmit in an assigned resource for securing the transmit priority over the second apparatus in the peer-to-peer communication link for transfer of data to the second apparatus based on a quality of service estimation, the assigned resource being in a first subset of contention resources of a set of contention resources, wherein the apparatus transmits in the assigned resource to indicate an intention to secure the transmit priority over the second apparatus in the peer-to-peer communication link; and transmitting to the second apparatus in the assigned resource based on the determination of whether to transmit in the assigned resources;

wherein the quality of service estimation is obtained by:

obtaining a first quality of service requirement for the apparatus;

receiving a second quality of service requirement from the second apparatus while forming the peer-to-peer communication link, the second quality of service requirement being for the second apparatus;

determining whether the first quality of service requirement is satisfied for the apparatus; and estimating whether the second quality of service requirement is satisfied for the second apparatus, wherein the quality of service estimation is based on a comparison of the satisfaction of the first quality of service requirement by the apparatus and the satisfaction of the second quality of service requirement by the second apparatus.

41. A computer program product in an apparatus for wireless communication, comprising: a non-transitory computer-readable medium comprising code for:

forming a peer-to-peer communication link with a second apparatus;

determining a transmit priority as between the apparatus and the second apparatus within the peer-to-peer communication link based on a quality of service estimation, the transmit priority being a priority of transmission between the apparatus and the second apparatus in the peer-to-peer communication link; and determining whether to transmit in an assigned resource based at least on the determination of the transmit priority, the assigned resource being in a first subset of contention resources of a set of contention resources, wherein the transmit priority indicates whether the apparatus has the priority of transmission over the second apparatus to transmit data in the peer-to-peer communication link;

wherein the quality of service estimation is obtained by:

obtaining a first quality of service requirement for the apparatus;

receiving a second quality of service requirement from the second apparatus while forming the peer-to-peer communication link, the second quality of service requirement being for the second apparatus;
determining whether the first quality of service requirement is satisfied for the apparatus; and
estimating whether the second quality of service requirement is satisfied for the second apparatus,
wherein the quality of service estimation is based on a comparison of the satisfaction of the first quality of service requirement by the apparatus and the satisfaction of the second quality of service requirement by the second apparatus.

\* \* \* \* \*